(12) United States Patent
Reichenberger et al.

(10) Patent No.: US 11,700,783 B2
(45) Date of Patent: *Jul. 18, 2023

(54) SEED INJECTION

(71) Applicant: AIT AUSTRIAN INSTITUTE OF TECHNOLOGY GMBH, Vienna (AT)

(72) Inventors: Günther Reichenberger, Uppsala (SE); Nikolaus Pfaffenbichler, Vienna (AT); Birgit Mitter, Hinterbrühl (AT); Johann Riesing, Vienna (AT); Günter Brader, Vienna (AT)

(73) Assignee: AIT AUSTRIAN INSTITUTE OF TECHNOLOGY GMBH, Vienna (AT)

(*) Notice: Subject to any disclaimer, the term of this patent is extended or adjusted under 35 U.S.C. 154(b) by 220 days.

This patent is subject to a terminal disclaimer.

(21) Appl. No.: 17/342,346

(22) Filed: Jun. 8, 2021

(65) Prior Publication Data

US 2021/0289686 A1 Sep. 23, 2021

Related U.S. Application Data

(63) Continuation-in-part of application No. 16/087,052, filed as application No. PCT/EP2017/056857 on Mar. 22, 2017, now Pat. No. 11,039,566.

(30) Foreign Application Priority Data

Mar. 22, 2016 (EP) ..................................... 16161625

(51) Int. Cl.
*A01C 1/08* (2006.01)
*B65G 47/84* (2006.01)

(52) U.S. Cl.
CPC .............. *A01C 1/08* (2013.01); *B65G 47/846* (2013.01)

(58) Field of Classification Search
CPC ....................................................... A01C 1/08
See application file for complete search history.

(56) References Cited

U.S. PATENT DOCUMENTS

| 4,315,380 A | * | 2/1982 | Davidson | .................. | C12C 1/02 |
| | | | | | 47/DIG. 9 |
| 4,633,611 A | * | 1/1987 | Schiller | .................... | A01C 1/08 |
| | | | | | 47/1.3 |

(Continued)

FOREIGN PATENT DOCUMENTS

| CN | 2060619 U | 8/1990 |
| RU | 2113111 C1 | 6/1998 |

(Continued)

OTHER PUBLICATIONS

International Search Report from International Patent Application No. PCT/EP2017/056857, dated Jun. 21, 2017 (3 pages).

(Continued)

*Primary Examiner* — Monica L Perry
*Assistant Examiner* — Brittany A Lowery
(74) *Attorney, Agent, or Firm* — Greer, Burns & Crain, Ltd

(57) ABSTRACT

A method for automatically preparing seeds with an additive to be deployed together with the seeds. The method includes conveying a plurality of seeds into an opening position, creating an opening in each of the seeds by cutting each seed with a fixed blade or a laser device when each seed is in the opening position, introducing an amount of additive into the seed through the opening and continuously conveying the plurality of seeds while creating the opening and introducing the amount of additive into the seeds.

15 Claims, 12 Drawing Sheets

(56) References Cited

U.S. PATENT DOCUMENTS

| | | | | |
|---|---|---|---|---|
| 6,076,301 | A * | 6/2000 | Eastin | A01C 1/02 47/DIG. 9 |
| 7,084,331 | B2 * | 8/2006 | Isawa | A01H 3/00 435/252.1 |
| 7,600,642 | B2 * | 10/2009 | Deppermann | G01N 35/025 209/552 |
| 7,906,313 | B2 * | 3/2011 | Henson | A01N 63/30 504/117 |
| 8,863,436 | B2 * | 10/2014 | Becker | G01N 1/04 47/14 |
| 9,003,696 | B2 * | 4/2015 | Deppermann | G01N 33/5097 47/14 |
| 9,383,291 | B2 * | 7/2016 | Deppermann | G01N 1/04 |
| 2007/0207485 | A1 * | 9/2007 | Deppermann | B26D 1/04 435/6.12 |
| 2008/0113367 | A1 * | 5/2008 | Becker | G01N 1/04 435/6.12 |
| 2012/0117865 | A1 * | 5/2012 | Deppermann | G01N 1/20 47/14 |
| 2015/0335029 | A1 * | 11/2015 | Mitter | C05F 11/08 504/117 |

FOREIGN PATENT DOCUMENTS

| | | |
|---|---|---|
| UA | 17919 C1 | 2/2000 |
| WO | 2012012411 A2 | 1/2012 |
| WO | 2015100432 A2 | 7/2015 |

OTHER PUBLICATIONS

Written Opinion of the International Searching Authority from International Patent Application No. PCT/EP2017/056857, dated Jun. 21, 2017 (7 pages).

International Preliminary Report on Patentability from International Patent Application No. PCT/EP2017/056857, dated Apr. 13, 2018 (12 pages).

Russian Office Action from corresponding Russian Patent Application No. 2018136869, dated Jun. 11, 2019.

Screen captures from YouTube video clip entitled "Inside Ford's Moving Assembly Line," 1 page, uploaded on Oct. 7, 2013 by user "Ford Media." Retrieved from Internet: <https://www.youtube.com/watch?v=jLud5XYfY_c>. (Year: 2013).

Chinese Office Action and translation from corresponding Chinese Patent Application No. 201780018106.6 dated Oct. 12, 2020.

* cited by examiner

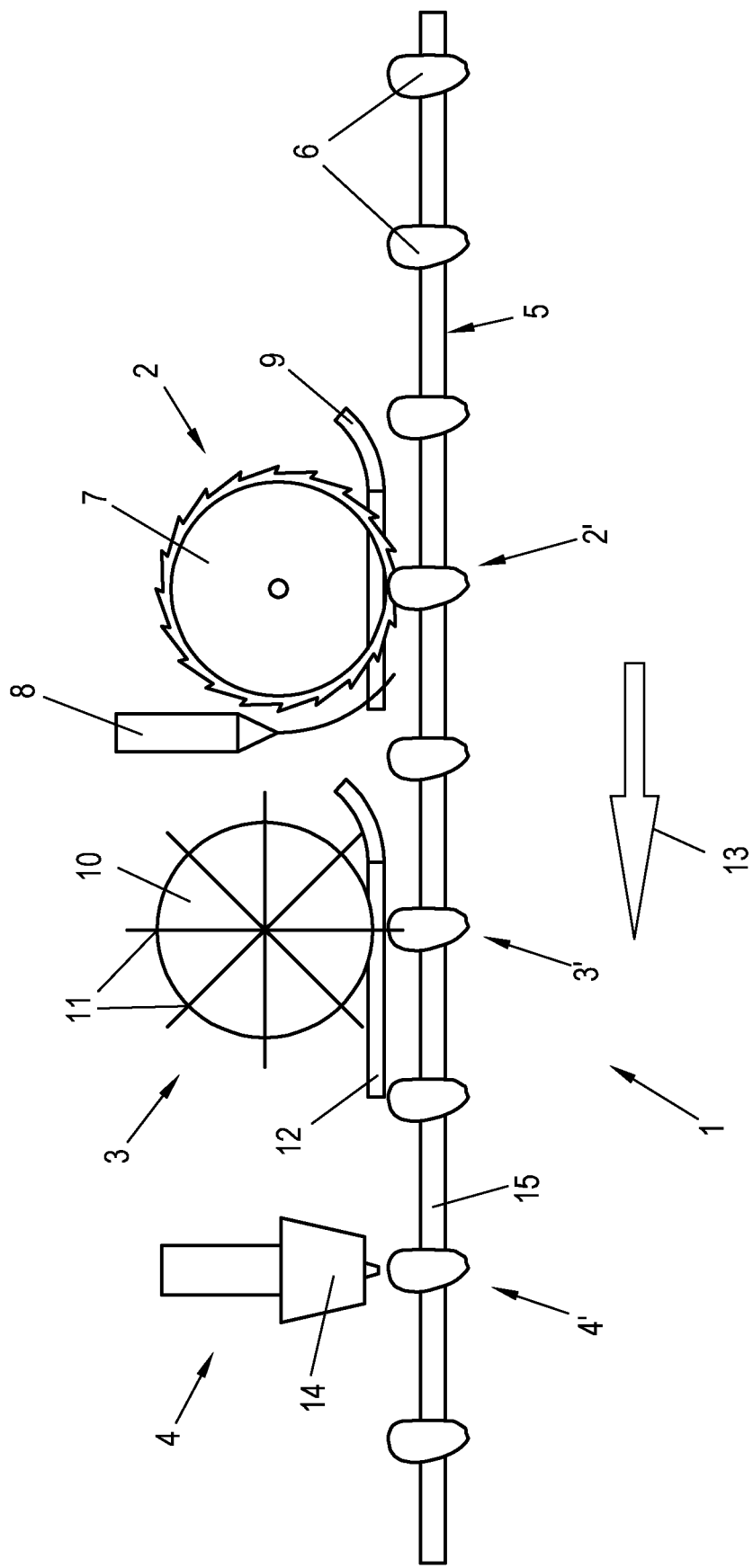

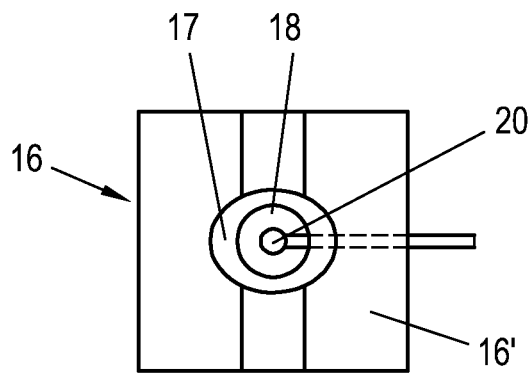
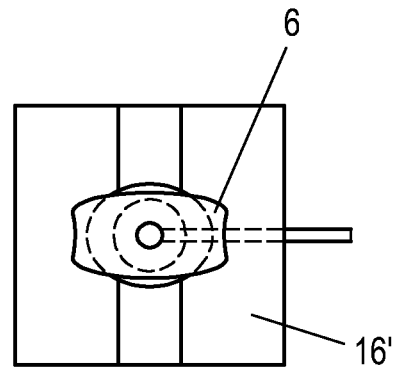
Fig. 2a    Fig. 3a
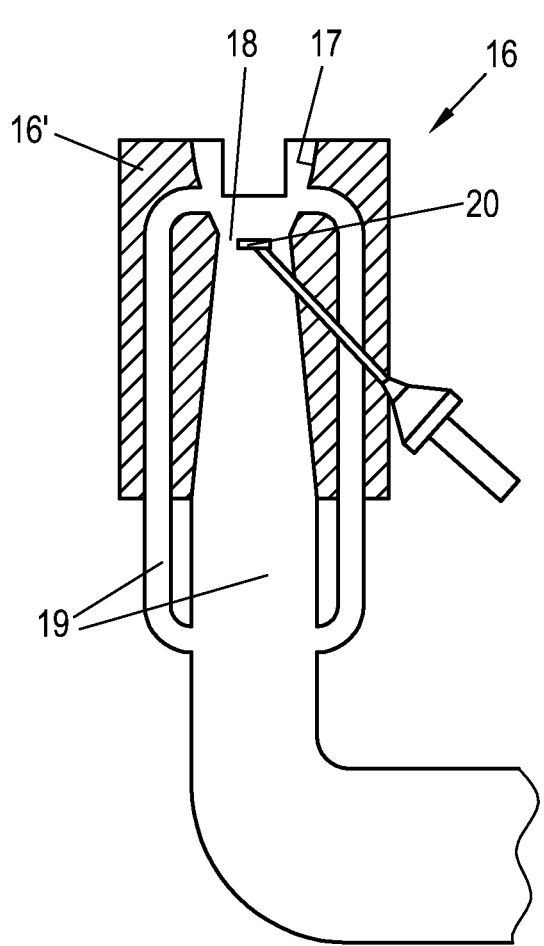
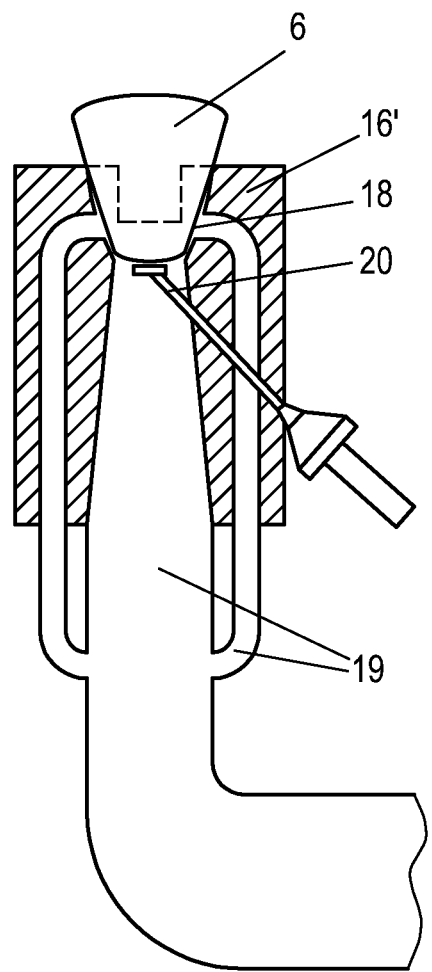
Fig. 2b    Fig. 3b

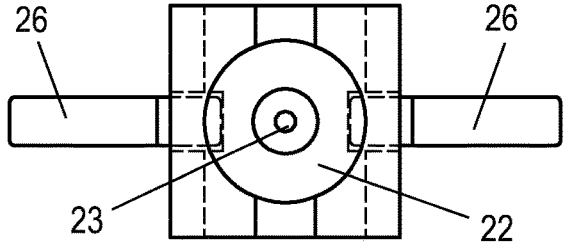
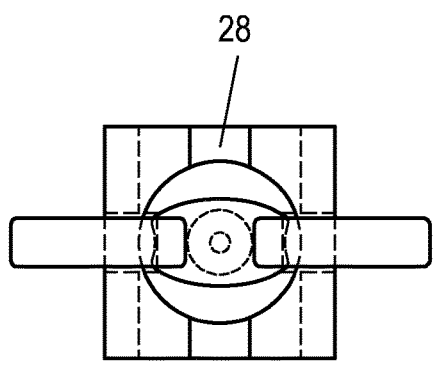
Fig. 4a
Fig. 5a
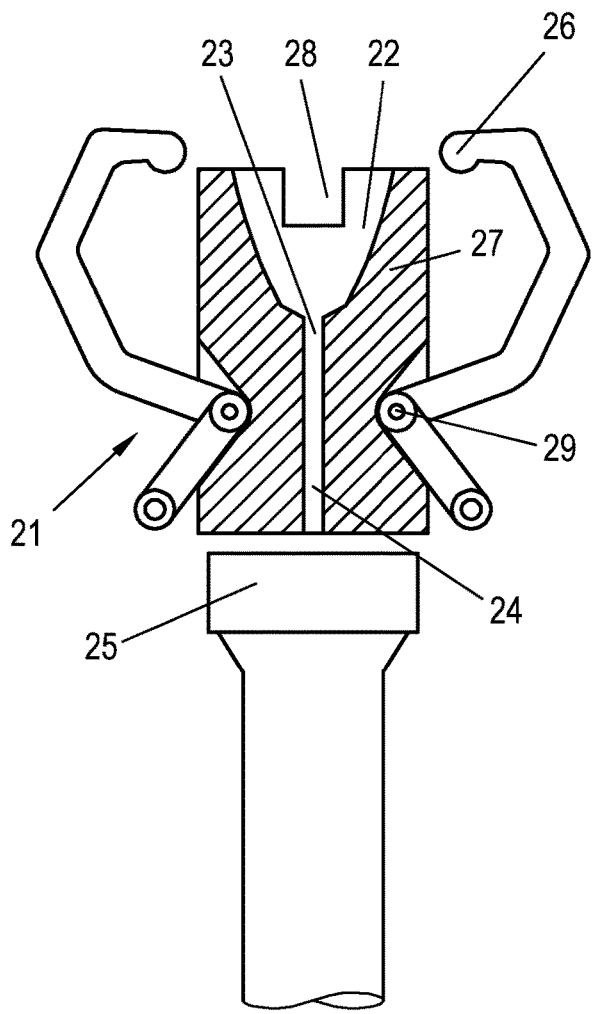
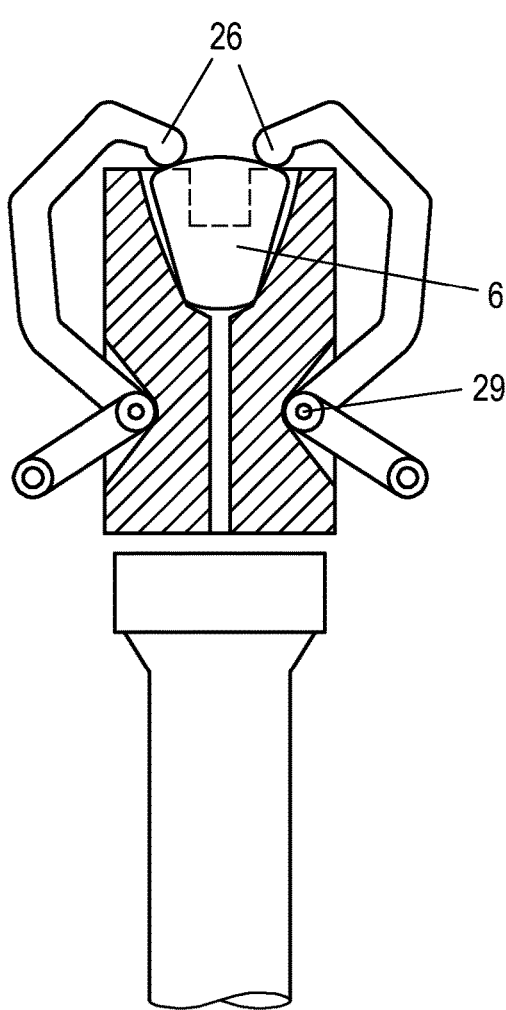
Fig. 4b
Fig. 5b

SEED INJECTION

CROSS-REFERENCE TO RELATED APPLICATIONS

This application is a continuation-in-part application of and claims priority to U.S. patent application Ser. No. 16/087,052 filed on Sep. 20, 2018, which is hereby incorporated by reference its entirety.

BACKGROUND

The present invention concerns a method and an apparatus for automatically preparing seeds with an additive to be deployed together with the seeds, as well as a seed product comprising a seed obtained by said method. Here the terms "seeds", "seed", "grains" or "grain" are used as a general reference to all kinds of propagative plant structures, which are suitable for industrial processing and distribution, including but not limited to commercially produced and distributed seed products, i.e., which meet common minimal requirements regarding quantity, distinctiveness, uniformity, stability and growability. In particular, this includes dry ungerminated seeds, soaked seeds, germinated seeds, tubers and other types of crop-parts that can be used for plant propagation, as well as plant shoots.

It is known to be advantageous to associate seeds with additives, which support desired plant properties, such as growth, or provide protection or resistance against environmental impact, including pest.

There are known methods to achieve such association.

EP 2 676 536 A1 discloses a method for inoculating the progeny of a plant with an additive via the flower of the mother plant. The bacteria sprayed to the flower is thereby relayed into the seeds resulting from the mother plant.

U.S. Pat. No. 7,084,331 B2 discloses a method for overlaying seeds with a suspension of additives. Moreover, it discloses a method where cultivated and germinated seedlings are cut with a scalpel loaded with bacterial cells, which are thereby inoculated into the growing plant.

These methods have specific disadvantages. When the additive is applied as a coating, it is exposed to environmental impact, such as washing or rubbing off, light, air and biological agents. When the flowering mother plant is inoculated, the amount and density of the additive in the seed is not controllable. Inoculation of the seedling has the disadvantage that the seedling has a low durability and stability compared to ungerminated seeds and therefore leads to difficulties regarding storage and distribution.

US 2007/207485 A1 shows an automated seed sampler system for opening the coat of a seed and extracting a sample of seed material from the open seed. Moreover, the application of a seed treatment such as a sealant to the exposed portion of the open seed is disclosed. The seed treatment can be any substance designed to enhance one or more properties of the seed or to protect the seed from bacteria or other harmful elements that could damage the seed and destroy the germination viability of the seed. In particular, the seed treatment may be a sealant comprising a fungicide and/or polymer. The opening of the seed is performed by a milling tool that must be approached and retracted to each seed individual, thereby limiting the speed and hence the throughput of this method and apparatus.

The WO 2012/012411 A2 discloses a different seed sampling system without the possibility to apply a treatment to the seeds.

It is an object of the present invention to overcome the disadvantages of the prior art. The present method allows for reliable application of a controlled, predefined amount of additive to a seed such that the additive is protected from environmental impact. At the same time the present method avoids major limitations of existing system with regard to processing speed and throughput. The seed is preferably hard and dry, in particular, not soaked; however, the invention applies to all types of seed as defined in the outset, including also fresh (grain) crop prior to drying and any processing.

SUMMARY

The method according to the present invention comprises: conveying a seed into an opening position; creating an opening in the seed when it is in the opening position; and introducing a predefined amount of additive into the seed through the opening, and it is characterized in that the opening is created by cutting. The opening position is not necessarily a single, specific spot, but can also be a zone or area, where the conditions for creating an opening are met, e.g., under a saw blade. The introduction of the additive is not necessarily a separate process step and can also be achieved during production of the opening. Surprisingly no noticeable negative impact on the germination of the prepared seeds is induced by the present method. Creating the opening by cutting makes it possible to convey the seeds continuously while creating the opening; i.e., it is not necessary to stop the seeds at the opening position for a certain amount of time. Hence the seed can effectively be moved through the opening position.

Correspondingly the apparatus according to the present invention comprises opening means for creating an opening in a seed, introducing means for introducing a predefined amount of additive into the seed through the opening, and conveying means for transporting the seed to the opening means, and is characterized in that the opening means is selected from a group comprising saws, blades and cutters. The opening means is not necessarily separate from the introducing means. The opening means and the introducing means may be the same, e.g., when using a blade loaded with the additive for cutting.

In order to minimize the rate of irregular seed preparation, it is advantageous if prior to conveying the seed into the opening position the method comprises: receiving the seed on a seed retainer; verifying an orientation of the seed on the seed retainer; and, if an orientation of the seed differs from an expected orientation, removing the seed from the seed retainer. The verification of the orientation may be performed actively, e.g., by optical detection and recognition, or passively, e.g., by testing mechanical constraints when the seed passes under a barrier or the like. The expected orientation is defined as the orientation corresponding to the seed retainer where the seed, when approaching the opening position, is opened at a position relatively insensitive to damage of the seed. The orientation of the seed during verification determines the orientation of the seed in the opening position, because the seed is retained in a fixed relative orientation between the verification and the opening position. Therefore, when the expected orientation is verified, the risk of destructing the seed during opening is significantly reduced. When an unexpected orientation is detected (i.e., when the expected orientation is not detected), the seed will not be conveyed into the opening position to prevent unforeseeable damage of the seed. Instead of directly conveying it into the opening position, the seed is removed from the seed retainer and may be recycled to a seed reservoir of unprepared seeds or to a different seed retainer or to an intermediate treatment for re-orientating the seed, before it is conveyed into an opening position.

Correspondingly the conveying means of the present apparatus preferably comprises a seed retainer for receiving the seed, wherein the apparatus further comprises verification means for verifying the orientation of the seed on the seed retainer before transporting the seed to the opening means.

The verification of the orientation of the seed can preferably be performed by optical sensor means. The optical sensor means may comprise an optical camera and processing means connected to the camera, which are configured to determine the position and orientation of a seed on the seed retainer based on an image recorded by the camera. Correspondingly the verification means of the apparatus may comprise optical sensor means.

Advantageously the present apparatus may further comprise an ejecting means connected with the verification means and configured to remove the seed from the seed retainer if an orientation of the seed differs from an expected orientation. The ejected seeds may be collected and recycled into the preparation, thereby reducing as far as possible any loss of unprepared seeds.

The conveying means are preferably configured to remove a number of seeds from a reservoir and singulate the seeds. A system implementing such means is known from US 2011/132721 A1. The practical utility of the present apparatus depends on the number of seeds that can be prepared in a given amount of time.

Preferably the conveying means used for conveying the seed into the opening position comprises at least two, preferably between 5 and 100, seed retainers for conveying seeds. By this conveying means, the entire preparation can be performed in a highly parallel fashion, i.e., performing all method steps at the same time, albeit (possibly) on different seed units.

Advantageously and to achieve a preparation speed for use in industrial applications, the conveying means can be configured to convey at least one, preferably at least 10, seed(s) per second into the opening position.

The present method is particularly suitable for seed of a plant family selected from the group comprising Poaceae, Fabaceae, Brassicaceae, Asteraceae, Solanaceae and Malvaceae, in particular, for seed selected from the group comprising corn seed, soy seed, sunflower seed, rape seed, pulses seeds, wheat seed, barley seed, rye seed, oat seed, triticale seed, rice seed, potato tubers, seed for plants of the cucurbit family and cotton seed (including any type of cotton, such as tree cotton and upland cotton), wherein the term "seed" is used as defined in the outset.

Preferably the created opening penetrates the seed coat and the additive injected into the endosperm or between the endosperm and the embryo of the seed within the present method. More specifically, it is desirable to avoid mechanical damage of the embryo during the opening of the seed.

Correspondingly, the introducing means of the apparatus for introducing the additive into the seeds is configured to inject the additive into the endosperm or between the endosperm and the embryo of the seed.

The present method is particularly suitable for additives which suffer significantly from the disadvantages of the prior art. In particular, the additive employed with the present method may be one or more selected from a group comprising endophytic microorganisms, preferably endophytic bacteria, particularly *Burkholderia, Rhizobium, Bradyrhizobium, Mesorhizobium, Sinorhizobium, Herbaspirillum, Azospirillum, Acetobacter, Arthrobacter, Bacillus, Enterobacter, Pseudomonas, Paenibacillus, Pantoea, Enterobacter* and *Burkholderia phytofirmans*, and endophytic fungi, particularly *Curvularia, Mycorrhiza, Pififmospora, Trichoderma*, and *Colletotrichum*. The term "endophyte"—in its broadest sense—refers to the location of an organism, wherein "endo" means "inside" and "phyte" means "plants". Therefore, endophyte refers to organisms that live within plants. Fungi and bacteria are the most common organisms associated with the term endophyte. Further examples of additives which can be employed in the present method are identified in Tables A, B, C, D, E, F, G, H, I, J, K, L, M, N and O of WO 2015/100432 A2. These additives may be introduced into the seed individually or in combination within the scope of the present invention. In contrast to such an embodiment of the present method, i.e., which specifically comprises the step of introducing fungi and/or bacteria as explained above, the treatment described in US 2007/0207485 A1 has the objective of avoiding any introduction of bacteria and fungi.

For the present invention, an "endophytic microorganism" is a microorganism that colonizes healthy tissue of a plant and is responsible for one or more plant beneficial effects, for example tolerance to drought, metals, disease (e.g., increasing resistance to pathogens and parasites), and herbivory, and/or growth promotion and nutrient acquisition, production of phytohormones, antibiotics (protection against microorganisms being harmful for seeds and plants) or siderophores, pesticides; promoting biological nitrogen fixation, etc. Some specific examples of such microorganisms, associated with their respective beneficial effect are: chilling tolerance (*Burkholderia*), salinity stress (*Achrobacter, Azospirillum*), tolerance to drought (*Burkholderia, Pantoea*), metals, disease (*Bacillus, Pseudomons, Xanthomonas*), growth promotion (*Azospirillum, Azotobacter, Bacillus, Burkholderia, Enterobacter, Klebsiella, Pantoea* and *Pseudomonas*) and nutrient acquisition (*Pseudomonas, Bacillus, Rhizobium, Micrococcus, Flavobacterium, Burkholderia, Achromobacter, Erwinia*, and *Agrobacterium*). Further examples of microorganisms and their beneficial effects are identified in or referenced by U.S. Pat. No. 7,906,313 B2 and included herein by reference. Within the scope of the present method, the identified additives may be used alone or together, i.e., a combination of two or more of the identified additives may be introduced into the seed.

If the seeds are closed during or after introduction of the additive, a protected environment within the seeds may advantageously be created for preserving the additive. Moreover, the closed seeds are less prone to damage of the seed itself. The closing of the seeds may be a separate process step. In particular, the seeds may be closed by sealing with an appropriate closing agent. Such a closing agent may comprise one or more of paraffin, starch, protein glue, talc, zeolith, sugars, nitrocellulose, resin, conventional seed coating, gelatin, chitin and synthetic glues. The closing agent may be solid, liquid, creamy, gel-like or paste-like under room temperature and pressure. A preferable closing agent is paraffin, which can be easily applied in a heated phase and is known to have no noticeable negative impact on the seed or on the resulting plant. The application of the closing agent may be adapted to the type and properties of the closing agent. The closing agent may be applied by spraying, soaking, brushing, grafting, dropping, stamping or rubbing. Also, the closing of the seeds is not necessarily a separate process step and can also be achieved during or together with introduction of the additive. For example, the additive may be suspended in the closing agent.

Correspondingly, the present apparatus may further comprise closing means for closing the seeds during or after introduction of the additive.

In order to achieve reproducible results with asymmetric seeds, it is advantageous if the present method comprises: orientating the seed in a predefined way prior to conveying the seed into the opening position. In a preferred embodiment, this step can be performed before the verification step described above, verifying that the expected orientation has been achieved. Based on a consistent orientation, the same general part of the seed can be opened on each seed and the additive is therefore introduced into and contained within the same general region of the seed each time.

Correspondingly, the present apparatus preferably further comprises orientating means for orientating the seed before it is opened.

The orientation of the seeds may be achieved by applying a vibrating motion and/or a pneumatic (air) pressure, by performing mechanical sieving, preferably through different pore sizes, and/or mechanical sorting. The method of orientation, preferably the vibration motion, can be chosen such as to promote a certain orientation due to the structure and mass distribution of the seeds. The vibration motion may also be used to achieve stochastic changes in orientation, wherein the seeds reach a stable position, e.g., due to a specifically structured support or the like, when they arrive in the desired orientation.

Especially depending on the technique employed for opening the seeds, it has turned out advantageous if the seed retainer is formed by a seed support, to which the seed is fastened before verifying the orientation. The seed support thereby provides a reproducible arrangement of the seed relative to the opening means. Consequently, the fastened seed avoids undesired relative movement between the opening means and the seed and the resulting risk of damage of the seed being opened.

Correspondingly, the seed retainer of the present apparatus may be formed by a seed support and means for fastening the seed to the seed support before it is opened. The seed support can be part of the conveying means. It is usually movable with respect to the opening means and as such provides for a controlled feed of seed to the opening means and the introducing means.

The seed support can have an at least partially conical support surface for receiving the seed. Preferably the seed support is adapted to receive a single seed of a given seed type being prepared. In this respect the conical support surface will advantageously correspond to the overall shape of the seed, especially in a preferred orientation of the seed within the seed support.

Moreover, the seed support may comprise a resilient portion for contacting the seed. This improves the stability of the seed on or in the seed support. Specifically, the resilient portion can absorb shocks, which may otherwise move the seed or eject it from the seed support. It can also provide for increased friction between the seed and the seed support.

The fastening of the seed can be achieved particularly easily and quickly if the seed is fastened to the seed support by adherence. The adherence can be enacted by the seed support immediately upon receiving the seed. Preferably the adherence is achieved by creating a negative fluid pressure between the seed and the seed support. The negative fluid pressure is preferably a below-atmospheric air-pressure, under pressure or (partial) vacuum. The seed is thereby maintained on the seed support due to a pressure difference effectively applying a force on the seed in the direction of the seed support.

Alternatively, or additionally, the seed may be fastened to the seed support by mechanical locking. Mechanical locking achieves a secure fixing of the seed in a well determined position. In addition, it usually prevents multiple seeds to be received in the same position, thus contributing to the singling of seeds.

The seed product according to the present invention as defined in the outset is characterized in that the seed comprises an opening and a predefined amount of additive inside the seed. The opening of the seed may preferably be sealed and/or filled, e.g., according to the preferable method steps described above, to form the seed product.

The invention specifically concerns the automatic and largescale processing of seeds according to the present method. Such processing and preparation is particularly advantageous where large quantities of similarly processed seeds are needed, e.g., for agriculture applications. The invention, i.e., the proposed method and apparatus, makes it possible to efficiently provide seeds on an industrial scale. Accordingly, the resulting seed product may be provided in a package or lot, the package or lot comprising at least 10, at least 30, at least 50 or at least 100 seed products or at least 5 kg, at least 10 kg or at least 20 kg of seed products. The seed products may be provided loose, e.g., as bulk goods, or packaged in a sack, e.g., a paper sack, bucket or other container.

In the following, preferred embodiments of the method, the apparatus and the seed product according to the invention will be defined, as well as preferred combinations thereof:

1. Method for automatically preparing seeds with an additive to be deployed together with the seeds, comprising: [0039] conveying a seed into an opening position; [0040] creating an opening in the seed when it is in the opening position; and introducing a predefined amount of additive into the seed through the opening, characterized in that the opening is created by cutting.

2. Method according to embodiment 1, characterized in that prior to conveying the seed into the opening position: [0043] receiving the seed on a seed retainer; [0044] verifying an orientation of the seed on the seed retainer; and [0045] if an orientation of the seed differs from an expected orientation removing the seed from the seed retainer.

3. Method according to embodiment 1 or 2, characterized in that a conveying means used for conveying the seed into the opening position comprises at least two, preferably between 5 and 100, seed retainers for conveying seeds.

4. Method according to embodiment 3, characterized in that the conveying means is configured to convey at least one, preferably at least 10, seed(s) per second into the opening position.

5. Method according to one of the preceding embodiments, characterized in that the seed belongs to a plant family selected from the group comprising Poaceae, Fabaceae, Brassicaceae, Asteraceae, Solanaceae and Malvaceae, in particular, the seed is selected from the group comprising corn seed, soy seed, sunflower seed, rape seed, pulses seeds, wheat seed, barley seed, rye seed, oat seed, triticale seed, rice seed, potato tubers, seed for plants of the cucurbit family and cotton seed.

6. Method according to one of the preceding embodiments, characterized in that the created opening penetrates the seed coat and the additive injected into the endosperm or between the endosperm and the embryo of the seed.

7. Method according to one of the preceding embodiments, characterized in that the additive is one ore more selected from a group comprising endophytic microorganisms, preferably endophytic bacteria, particularly *Burkholderia, Rhizobium, Bradyrhizobium, Mesorhizobium, Sinorhizobium, Herbaspirillum, Azospirillum, Acetobacter, Arthrobacter, Bacillus, Enterobacter, Pseudomonas, Paenibacillus, Pantoea, Enterobacter* and *Burkholderia phytofirmans*, and endophytic fungi, particularly *Curvularia, Mycorrhiza, Pififmospora, Trichoderma*, and *Colletotrichum*.

8. Method according to one of the preceding embodiments, characterized in that the seeds are closed during or after introduction of the additive.

9. Method according to embodiment 8, characterized in that the seeds are closed by applying an appropriate closing agent, in particular, a closing agent comprising one or more of paraffin, starch, protein glue, talc, zeolith, sugars, nitrocellulose, resin, conventional seed coating, gelatin, chitin and synthetic glues.

10. Method according to one of the preceding embodiments, characterized by orientating the seed in a predefined way prior to conveying the seed into the opening position.

11. Method according to one of embodiments 2 to 10, characterized in that the seed retainer is formed by a seed support, to which the seed is fastened before verifying the orientation.

12. Method according to embodiment 11, characterized in that the seed is fastened to the seed support by adherence.

13. Method according to embodiment 12, characterized in that the adherence is achieved by creating a negative fluid pressure between the seed and the seed support.

14. Method according to embodiment 11, characterized in that the seed is fastened to the seed support by mechanical locking.

15. Method according to one of embodiments 11 to 14, characterized in that the seed support has an at least partially conical support surface for receiving the seed.

16. Method according to one of embodiments 11 to 15, characterized in that the seed support comprises a resilient portion for contacting the seed received on the seed support.

17. Method according to one of embodiments 10 to 16, characterized in that the orientation of the seeds is achieved by applying a vibrating motion and/or a pneumatic pressure or by performing mechanical sieving, preferably through different pore sizes, and/or mechanical sorting, before verifying the orientation of the seed.

18. Apparatus for automatically preparing seeds with an additive to be deployed together with the seeds, comprising opening means for creating an opening in a seed, introducing means for introducing a predefined amount of additive into the seed through the opening, and conveying means for transporting the seed to the opening means, characterized in that the opening means is selected from a group comprising saws, blades and cutters.

19. Apparatus according to embodiment 18, characterized in that the conveying means comprises a seed retainer for receiving the seed, wherein the apparatus further comprises verification means for verifying the orientation of the seed on the seed retainer before transporting the seed to the opening means.

20. Apparatus according to embodiment 19, characterized in that the conveying means comprises an ejecting means connected with the verification means and configured to remove the seed from the seed retainer if an orientation of the seed differs from an expected orientation.

21. Apparatus according to embodiment 19 or 20, characterized in that the conveying means comprises at least two, preferably between 5 and 100, seed retainers.

22. Apparatus according to one of embodiments 18 to 21, characterized in that the conveying means is configured to transport at least one, preferably at least 10, seed(s) per second to the opening means.

23. Apparatus according to one of the preceding embodiments, characterized in that the introducing means is configured to inject the additive into the endosperm or between the endosperm and the embryo of the seed.

24. Apparatus according to one of embodiments 18 to 23, characterized in that the apparatus further comprises closing means for closing the seeds during or after introduction of the additive.

25. Apparatus according to one of embodiments 18 to 24, characterized in that the apparatus further comprises orientating means for orientating the seed before it is opened.

26. Apparatus according to one of embodiments 18 to 25, characterized in that the seed retainer is formed by a seed support and means for fastening the seed to the seed support before it is opened.

27. Apparatus according to embodiment 26, characterized in that the seed support has an at least partially conical support surface for receiving the seed.

28. Apparatus according to embodiment 26 or 27, characterized in that the seed support comprises a resilient portion for contacting the seed.

29. Seed product obtained by a method according to one of embodiments 1 to 17, comprising an, preferably sealed and/or filled, opening in the seed and a predefined amount of additive inside the seed.

30. Package or lot of seed products comprising at least 10, at least 30, at least 50 or at least 100 seed products according to embodiment 29.

BRIEF DESCRIPTION OF THE DRAWINGS

The invention will be defined in more detail below by means of preferred exemplary embodiments, to which it is not to be limited to, however, and with reference to the drawings. In detail:

FIG. 1 is an overview of a simplified apparatus according to the invention;

FIGS. 2*a* and 2*b* show a plan view and sectional view respectively of a simple seed support based on negative pressure;

FIGS. 3*a* and 3*b* correspond to FIGS. 2*a* and 2*b*, wherein a seed is received in the seed support;

FIGS. 4*a* and 4*b* show a plan view and sectional view respectively of a simple seed support for mechanical locking the seed;

FIGS. 5*a* and 5*b* correspond to FIGS. 4*a* and 4*b*, wherein a seed is received in the seed support;

FIGS. 12a, 12b and 12c show a detailed view of a handover between the two seed support types according to FIG. 11, wherein FIG. 12a shows a cut along the line A-A in FIG. 12b, FIG. 12b shows a cut along the line B-B in FIGS. 12a and 12c, and FIG. 12c shows a cut along the line C-C in FIG. 12b;

DETAILED DESCRIPTION

Figure 6:
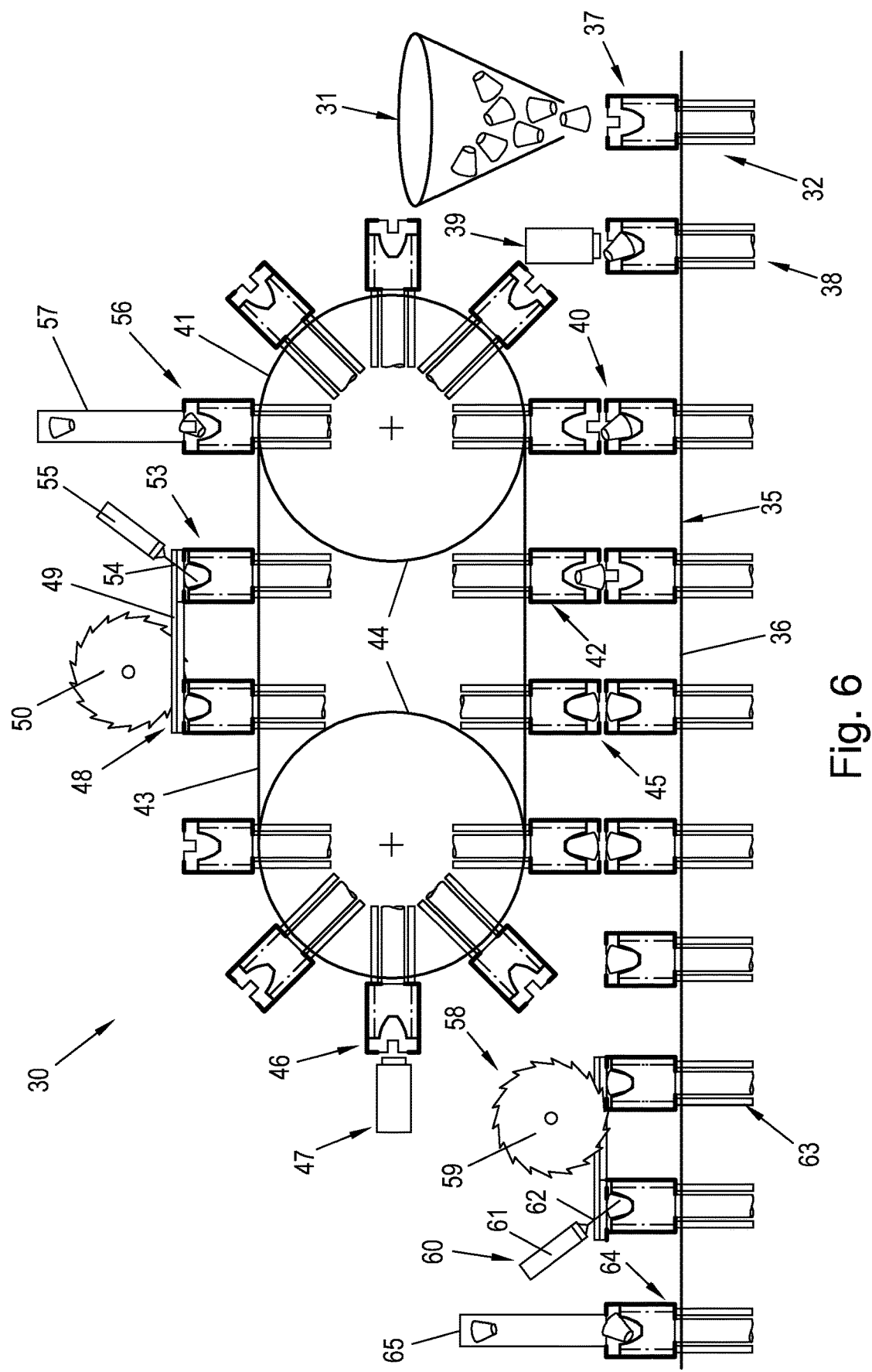
FIG. 6 shows a schematic overview of an apparatus for preparing seeds by opening the seeds by cutting and subsequently injecting an additive.

One object of the invention is to propose an automated apparatus for introducing an additive (or multiple additives, separately or as a mixture) into seeds. Generally, the seeds are fractionated by their respective shape and/or size prior to the preparation performed by the apparatus.

The apparatus 1 shown in FIG. 1 comprises opening means 2, injecting means 3 and closing means 4 and conveying means 5 for transporting seeds 6 between said means. The opening means 2 comprises a saw with a rotating blade 7, preferably a diamond blade, with a cutting width of approximately 0.5 mm (in the present example of a corn seed). The blade 7 is arranged to cut into the upwards orientated end of the seed 6 when the seed 6 is arranged in an opening position 2'. The saw is suspended on a resilient suspension 8. The resiliency of the suspension can be realized by a spring. The suspension 8 holds a base plate 9 of the saw against the upper side of the seed 6 below the base plate 9. The distance between the base plate 9, and the center of the blade 7 is configured to provide a pre-determined cutting depth, preferably a cutting depth of approximately 1.5 mm (in the present example of a corn seed), into the upper end of the seed 6 facing the saw in the opening position 2'. The cutting depth is essentially equal for every seed passing below the opening means 2. The cutting depth is generally adjusted to the expected (minimum) distance of the embryo from the upper side of the seed 6, i.e., it is less or equal said expected distance. Therefore, damage of the embryo can be avoided. In the present example the saw produces a slit in the upper part of the seed, which slit is about 0.5 mm wide and 1.5 mm deep. These dimensions will be adapted to the type of seed under preparation, i.e., the dimensions will generally be reduced for smaller seed types and may be larger for larger seed types. It is also possible that multiple openings may be useful for very large types of seeds (e.g., tubers).

The injecting means 3 comprises a pivotable disk 10 carrying multiple hollow needles 11 for guiding a fluid additive. The disk 10 is generally mounted above a base plate 12 for guiding the seed 6 below the injecting means 3. The needles 11 are resiliently supported relative to the seed 6 and configured to enter the slit created by the opening means 2 of each seed 6 passing below the injecting means 3. The diameter of the needles 11 is therefore smaller than the width of the slit, which in turn is determined by the thickness of the saw blade 7. The pivotable disk 10 of the injecting means is configured to rotate the needles 11 in a manner coordinated with the movement of the seed 6 below the base plate 12. In particular, the rotation speed of the disk is chosen such that there is practically no relative movement in a conveying direction 13 between a needle 11 inserted into a slit of a seed 6 and the respective seed 6. The needle 11 therefore enters the seed 6 and is retracted from the seed 6 in a direction substantially perpendicular to the conveying direction 13.

The closing means 4 comprises a nozzle 14 for applying a sealing to the slit of the seed 6 passing below the nozzle 14. Preferably the nozzle 14 is connected to a paraffin stock and configured to heat a small amount of paraffin and apply the molten paraffin to the slit of the seed 6, thereby closing the slit. Alternatively, the nozzle may be configured to apply a different type of coating to the seed 6, e.g., a type of stain. Instead of the nozzle 14, e.g., a brush may be used to apply the sealing to the seed 6.

The conveying means 5 is displayed as a simplified conveyor belt 15 in FIG. 1, on which multiple seeds 6 are arranged in an orientated and equally spaced fashion. The indicated seeds 6 are corn seeds, wherein the orientation of the seeds 6 on the conveyor belt 15 is such that the broader upper end of the seeds 6 is facing the opening means 2. Generally, the preferred orientation of the seeds 6 with respect to the opening means 2 is such that the embryo within the seed is facing away from the opening means 2, i.e., the location where an opening will be created is on a side opposite the embryo. The conveying means 5 conveys the seeds 6 from a reservoir and feeding means (not shown) on the right-hand side in the conveying direction 13 to the left. The first position assumed by each unprepared seed 6 is the opening position 2', where an opening is created in the seed 6 as explained in detail above. From the opening position 2' the seed 6 is then conveyed further on to an injecting position 3' below the injecting means 3 for introduction of the predefined amount of additive. When the correct amount of additive has been introduced, the seed 6 is conveyed by the conveying means 5 into a closing position 4' underneath the closing means 4, where the opening of the seed 6 is closed. Finally, and after the closing position 4', the prepared seed 6 is discarded from the conveying means 5 and collected in a product reservoir (not shown) on the left-hand side. During opening of the seed 6 and during injection of the additive, the seed 6 is fixed relative to the opening means 2 and injecting means 3 respectively.

The seed 6 is retained on the conveying means 5 in a seed retainer 16. In order for fixing the seed 6 on the conveying means 5, the seed retainer is formed by a seed support 16'. FIGS. 2a and 2b show a simple seed support 16' based on negative pressure. The seed support 16' comprises a conically shaped socket 17. FIGS. 3a and 3b show the same seed support 16' as FIGS. 2a and 2b together with a seed 6 received in the socket 17. The socket 17 has a number of openings 18 connected to air channels 19. In order to fixate a seed 6 within the socket 17, a negative air pressure is applied to the air channels 19, thereby producing a sucking effect between the socket 17 and the seed 6. The bottom opening is larger than opening in the side walls of the socket 17. This allows for an efficient distribution of negative pressure within the socket. Preferably the inner surface of the socket 17 comprises a resilient portion (not shown), i.e., the surface is at least partially formed by a resilient material such as a rubber coating. The resilient portion allows for minor adaptations of the shape of the socket 17 to the shape of the seed 6, thereby achieving an air-tight contact and thus a particularly stable fixation of the seed 6. The seed support 16' further comprises a pressure nozzle 20, which is arranged in the bottom center of the socket 17, in particular, within the bottom opening of the socket 17. The pressure nozzle 20 is connected to a compressed air channel via a controllable valve (not shown). By opening the valve and releasing a jet of compressed air through the pressure nozzle 20, a seed 6 received in the socket 17 can be removed, i.e., blown out, of the socket 17.

FIGS. 4a and 4b show an alternative simple seed support 21 for mechanical locking a seed within the seed support 21. As in the previous example, the seed support 21 comprises a socket 22 for receiving a seed. In FIGS. 4a and 4b the seed support 21 is displayed in an open position. FIGS. 5a and 5b show the seed support 21 of FIGS. 4a and 4b in a closed position, with a seed 6 received in the socket 22. The socket 22 has an opening 23 at the bottom, which is connected to an air channel 24 for applying compressed air and blowing a seed out of the socket 22. The compressed air may be introduced by a fixed nozzle 25 arranged next to the seed support 21. The seed support 21 may be separate from the nozzle 25 and moveable with respect to the nozzle 25.

The seed support 21 further comprises two clamps 26, which are pivotable with respect to the socket 22 and mounted to a body 27 of the seed support 21. The clamps 26 are configured to hold the seed 6 within the socket 22 in a closed position (see FIG. 5b) by pushing the seed 6 to the bottom of the socket 22. The actual shape of the socket 22 is adapted to the fractionation of the seed 6. Also, the shape of the clamps 26 can be configured to the shape of the seed 6. The inner surface of the socket 22 and the ends of the clamps 26 are covered with a rubber coating in order to increase the friction between the seed 6 and the seed support 21 and thereby improve the hold of the seed 6 within the socket 22. On the upper side of the seed support 21, a clearance 28 is foreseen. The clearance 28 is arranged perpendicular to the vertical axis of the socket 22 and configured to receive the blade 7 of a saw for opening the seed 6 (see FIG. 1) when the seed 6 is being opened. In operation, the clearance 28 is arranged parallel to a conveying direction 13 of the seed 6.

The clamps 26 are pivotable about an axis 29. The axis 29 is arranged in a recessed portion of the body 27. The movement of the claim 26 may be controlled pneumatically, hydraulically, via springs or other means.

A more detailed example of an apparatus 30 for carrying out the present invention is shown in FIG. 6. The apparatus 30 comprises feeding means 31 schematically illustrated as a funnel configured to discharge singularized seeds into a seed support 32 arranged below the funnel. A seed receiving aperture 33 of a socket 34 of the seed support 32 (cf FIG. 7b) is facing a discharge opening of the funnel forming the feeding means 31. The seed support 32 is connected to a conveying means 35, which is formed by a linear conveyor belt 36 represented in a simplified form (e.g., without showing the return path). There is at least one seed support 32 connected to the conveyor belt 36, which seed support 32 is moved between different operating positions, which will be described below for a multiplicity of separate seed supports 32 as shown in FIG. 6. In the present example the conveyor belt 36 comprises 10 seed supports 32, wherein further seed supports 32 can be expected on a return path (not shown) of the conveyor belt 36. The first operating position explained above is the receiving position 37 wherein the seed support 32 is interacting with the feeding means 31. Subsequent to the insertion of a seed into the socket 34, the seed support or at least a part thereof is agitated or vibrated in order to promote a correct orientation of the seed within the socket 34.

Following the receiving position 37, the seed support 32 next moves into a verification position 38. In the verification position 38 a verification means 39 of the apparatus 30, for example a digital camera comprising a CCD sensor, is arranged essentially opposite the receiving aperture 33. The verification means 39 is arranged and configured to verify the orientation and preferably the position of a seed received in the seed retainer formed by the socket 35. In particular, the verification means 39 detects whether the seed is aligned with the socket 35, in which case the orientation of the seed corresponds to the expected orientation, which is the orientation of the socket 35 having a shape corresponding with the shape of the seed, or whether the orientation of the seed is aslant with respect to the socket 35, in which case the orientation differs from the expected orientation. The verification means 39 detects the orientation of the seed within the socket 35 and stores the result, i.e., correct/incorrect orientation, and associates the stored result with the seed support 32 in the verification position 38.

Following the verification position 38, the seed support 32 is moved into a handover track 40. Along the handover track 40 a second conveying means 41 carrying at least a second seed support 42 is arranged essentially parallel to the first conveying means 35 discussed above. The second conveying means 41 comprises a second conveyor belt 43 mounted on two rotating reels 44. The second conveying means 41 comprises 14 seed supports 32 forming seed retainers for conveying seeds 6. The second conveying means 41 is part of a second processing line for preparing seeds, wherein the first conveying means 35 is part of a first processing line for preparing seeds. In contrast to the first processing line, the second processing line does not have a separate feeding means but is configured to receive misaligned seeds, i.e., seeds having an incorrect orientation, along the handover track 40 from the first processing line. For this purpose, the second seed support 42 and the (first) seed support 32 are moved in a handover position 45. In the handover position 45, the receiving aperture 33 of the first seed support 32 faces the receiving aperture 33 of the second seed support 42. There may be a distance between the two opposed seed supports 32, 42 in the handover position 45, which is chosen such that a misaligned seed fits between them. If the verification of the orientation has shown an incorrect orientation of the seed 6, the seed 6 is removed from the seed retainer formed by the socket 34 of the first seed support 32 and handed over to a socket 34 of the second seed support 42 in the handover position 45. In this position the handover of the seed is performed by blowing the misaligned seed out of the socket 34 of the first seed support 32. At the same time a negative pressure is applied to the socket 34 of the second seed support 42, thereby pulling the loose seed towards the receiving aperture 33 of the second seed support 42 and into its socket 34. The negative pressure on the second seed support 42 is upheld in order to hold and secure the seed.

Subsequent the handover track 40, the second seed support 42 is advanced into a second verification position 46. In the second verification position 46 a second verification means 47 of the second processing line of the apparatus 30, for example a digital camera comprising a CCD sensor, is arranged essentially opposite the receiving aperture 33 of the second seed support 42. The second verification means 47 is similar to the (first) verification means 39 described above. If the seed is again misaligned, it may be fed back to the feeding means 31 of the first processing line.

After successful verification of the correct orientation of the seed within the second seed support 42, the second seed support 42 is moved to an opening position 48. In the opening position 48 the second seed support 42 is advanced below a base plate 49 of a saw comprising a rotating saw blade 50. The saw blade 50 enters the clearances 51, 52 adjacent the receiving aperture 33 of the seed support 42 (see FIG. 7a) and cuts into the upper end of a seed received in the socket 34 of the second seed support 42 when the seed is moved in a tangential direction below the saw. Thereby the saw opens the seed by cutting an opening into the upper end. After the cut has been created, the seed support 42 holding the now open seed is moved from the opening position 48 to an injection position 53.

In the injection position 53 a needle 54 connected to a nozzle 55 extends below the base plate 49 such that it can extend into a cut opening of a seed received within the seed support 42 in the injection position 53. In operation, the intended additive is delivered to the nozzle 55 of the second processing line and introduced through the needle 54 and the opening into the seed.

Following the injection position 53 the second seed support 42 is advanced to an extraction position 56. In the extraction position 56, an extraction system 57 is arranged opposite the second seed support 42, such that an inlet opening of the extraction system 57 faces the receiving aperture 32. Specifically, the extraction system 57 is configured to apply negative pressure to the socket 34. For extracting a seed received therein, an ejection mechanism of the seed support 42 is operated, ejecting the seed from the socket 34 and toward an inlet opening of the extraction system 57.

Subsequent to the extraction position 56, the emptied seed support 42 is again moved to the handover track 40 in order to receive a new, unprepared seed. From the perspective of the seed and its preparation, the second processing line starts with the handover track 40 and finishes in the extraction position 56 and the extraction system 57.

Those seeds that are correctly aligned within the first seed support 32 based on the verification remain in the first processing line; i.e., they are not handed over to the second processing line but instead pass the handover track 40 while remaining in the same first seed support 32. After the handover track 40, the seed support 32 is moved to an opening position 58, similar to the opening position 48 described above for the second processing line. The first seed support 32 passes below a saw blade 59, which opens the seed received therein, and—in an injection position 63—introducing means 60 in the form of a nozzle 61 and a needle 62, which are configured to introduce an additive supplied to the nozzle 61 into the cut opening of a seed. The supply of the additive is preferably performed via a metering equipment (not shown) in order to provide a well-defined amount of additive to the nozzle 61. The successfully prepared seed is removed from the first seed support 32 in an extraction position 64 by an extraction system 65 as explained above for the second processing line.

The speed at which seeds can be automatically prepared with the present method or using the present apparatus is higher than 1 per second, preferably at least 5 seeds per second, wherein a preparation speed between 10 and 100 seeds per second per processing line is possible. Higher speeds are mostly limited by the mechanical movement of the seed supports. The (optical) verification would in principle support also higher speeds. Another limiting factor is the orientation of the seeds, e.g., by vibration. Regarding the overall speed of the apparatus, of course higher speed in terms of throughput may be achieved by parallelizing parts of the processing or entire processing lines.

Figure 7A:
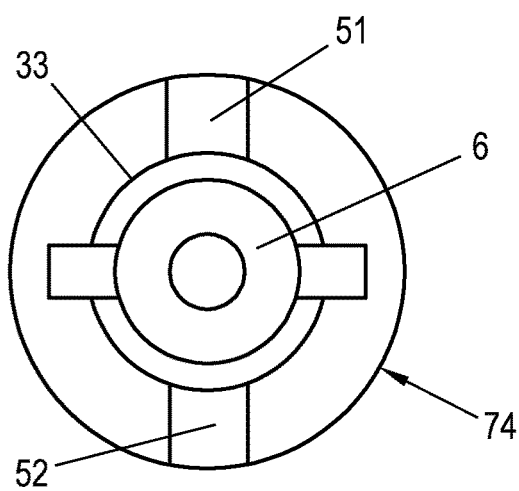
FIGS. 7*a* and 7*b* show a plan view and sectional view respectively of an advanced seed support based on negative pressure according to FIG. 6.
Figure 7B:
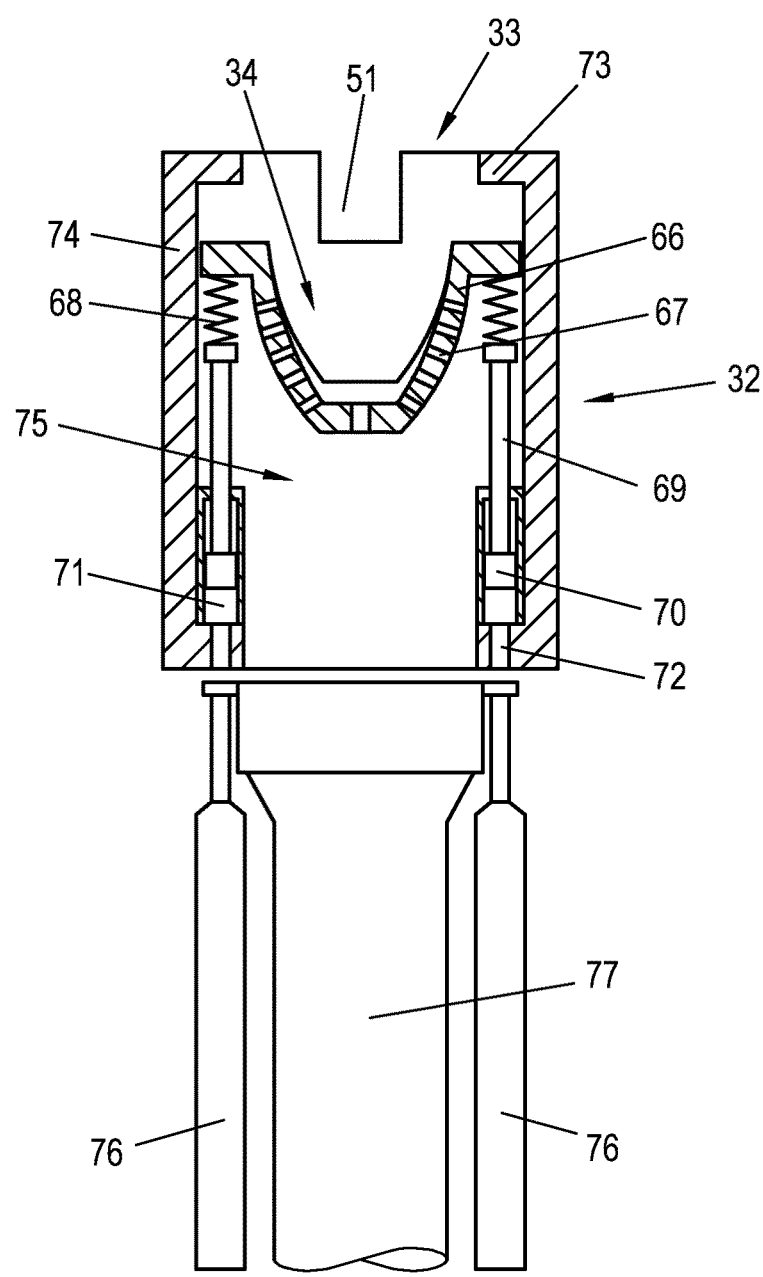

The seed supports 32, 42 of the apparatus 30 in FIG. 6 are preferably of the type shown in more detail in FIGS. 7a and 7b. Especially FIG. 7b shows that the socket 34 of the seed support 32 is formed by a sieve-like moveable basket 66 having several perforations 67 in its side and bottom walls. The basket 66 is suspended on two sides via springs 68 on piston rods 69 and moveable in a longitudinal direction, perpendicular to the receiving aperture 33 of the seed support 32. At the end of said piston rods 69 pistons 70 are arranged in pneumatic chambers 71 having an inlet 72 for pressurized air. By applying positive pressure to said chambers 71, the pistons 70 are forced upward in the direction of the receiving aperture 33 of the seed support 32 as the volume contained in the chamber 71 expands. Along with the pistons 70 the basket 66 is moved upward via the piston rods 69 and the springs 68. The movement of the basket 66 is limited by a flange 73 of a housing 74 of the seed support 32. When the upper edge of the basket 66 hits the flange 73, the movement of the basket 66 is stopped abruptly. At this point a seed contained in the basket 66 will continue its upward motion conserving its momentum. The piston rods 69 will be slowed down continuously against the force of the springs 68, thereby compressing the springs 68.

When the positive pressure is removed from the chambers 71, the basket 66 will drop back into its lowermost position under the influence of gravity. In addition, the basket 66—and eventually a seed received therein—will be pulled into this lowermost position by a negative pressure applied to the empty space 75 underneath the basket 66, i.e., on a side of the basket 66 opposite the receiving aperture 33 of the seed support 32. In FIG. 7b, positive pressure connections 76 as well as a negative pressure connection 77 are shown, which operate the functions of the seed support 32 explained above. The negative pressure connection 77 preferably has a larger diameter than the positive pressure connections 76 in order to efficiently apply a negative pressure.

The shape of the basket 66 is adapted to the shape of the seed to be prepared. In general, the basket 66 preferably has a conical shape. The inner side of the basket 66, i.e., the side contacting the seed, preferably has a coating of a resilient, rubber-like material to achieve an air-tight connection between the basket 66 and the seed received therein.

Figure 7C:
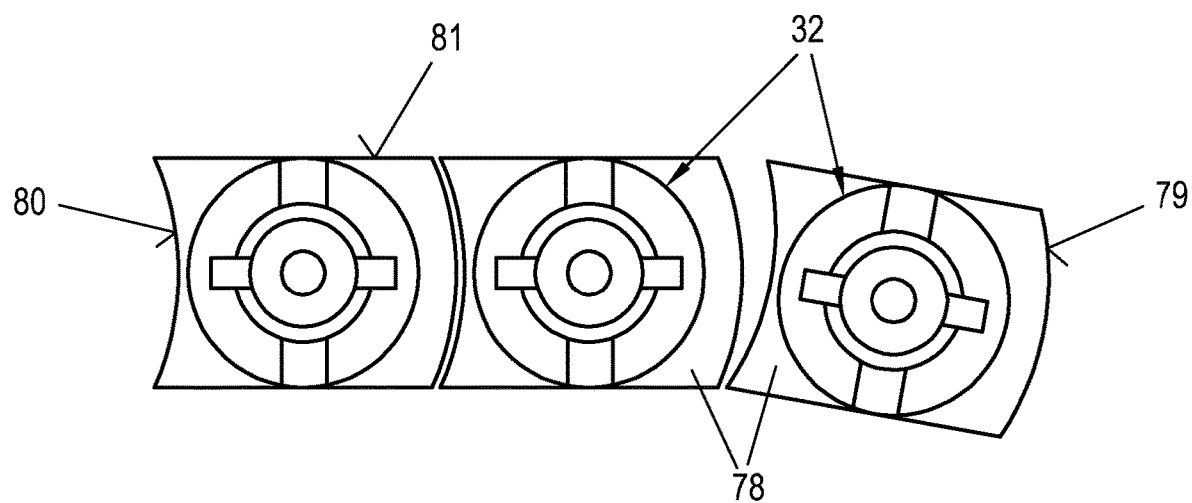
FIG. 7*c* shows a plan view of an arrangement of a sequence of seed supports according to FIG. 7*a;*

FIG. 7c shows a chain of lined up seed supports 32, wherein the seed supports 32 are separated by interlocked frames 78. The frames 78 each have front and rear contact surfaces 79, 80. The contact surfaces 79, 80 are rounded correspondingly to achieve stabilization against transverse (with respect to the chain) movement of the seed supports 32. The lateral borders 81, which are essentially parallel to the direction of movement of the seed support chain, are straight.

Figure 8A:
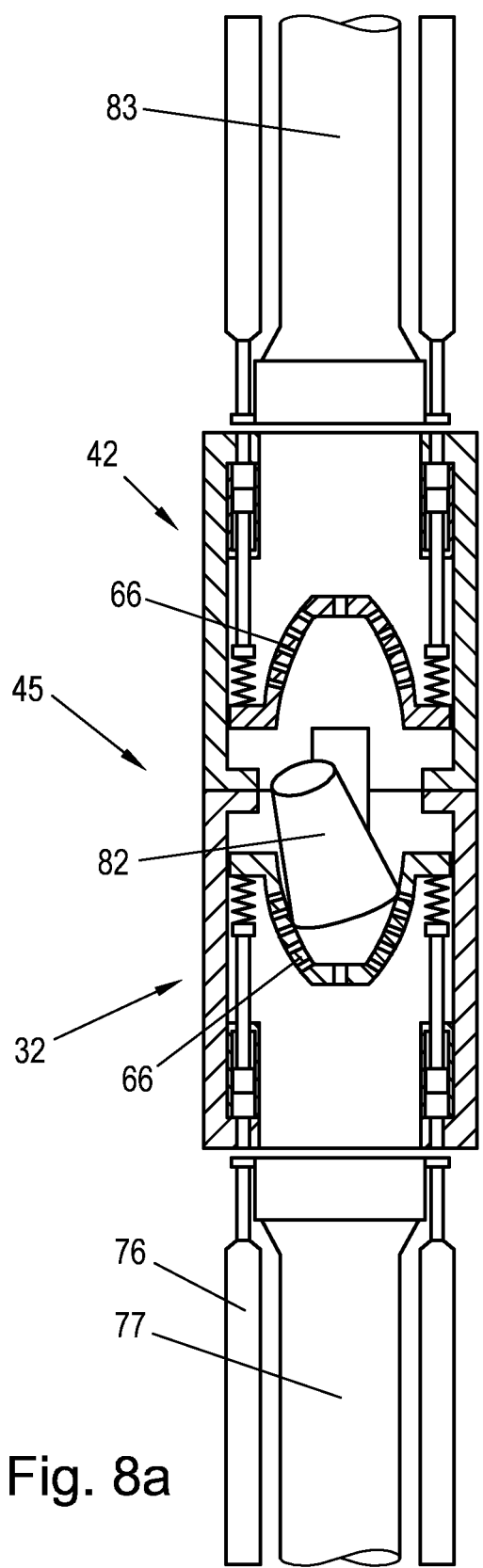
FIG. 8*a* shows a sectional view of two opposite seed supports according to FIG. 7*b* with a misaligned seed.
Figure 8B:
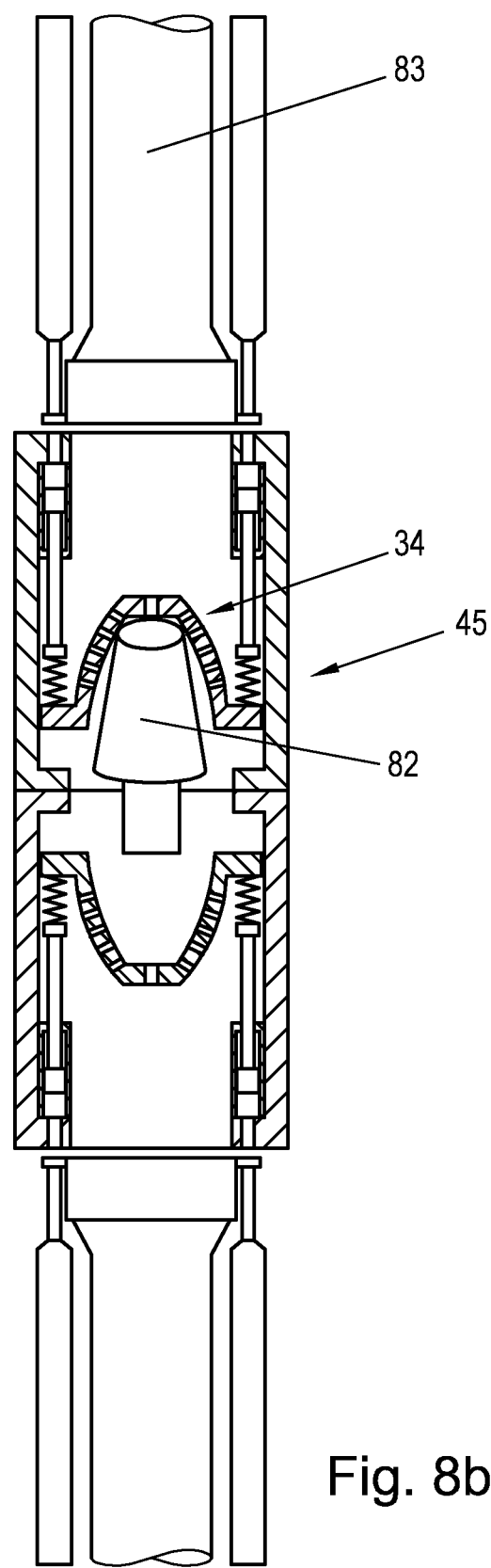
FIG. 8b corresponds to FIG. 8a wherein the seed has been aligned.

FIGS. 8a and 8b show the handover position 45 of two seed supports 32, 42 along the handover track 40 in FIG. 6 in more detail. In FIG. 8a a seed 82 is received in the first seed support 32 in an incorrect orientation. In this example the seed 82 is a corn seed, which is arranged with the embryo of the seed 82 pointing upwards away from the seed support 32. Moreover, the generally conical shape of the seed 82 does not align with the corresponding shape of the basket 66 forming the socket 34 of the seed support 32 (cf FIG. 7b). The second seed support 42 is arranged opposite the first seed support 32 such that the receiving apertures 33 of the first and second seed support 32, 42 are facing each other. The sockets 34 of the two seed supports 32, 42 are together defining a closed cavity in which the seed 82 is contained. Therefore, when the seed 82 is ejected from the first seed support 32, it will be forced to move to the second seed support 42. This movement can be supported by negative pressure or suction applied to the second seed support 42 via the dedicated negative pressure connection 83. At the same time, the negative pressure connection 77 of the first seed support 32 is disabled to avoid holding the seed 82 in the misaligned position.

As shown in FIG. 8b the seed 82 is moved into a correct orientation in the second seed support 42 by the above-described procedure. Specifically, the upside-down conical shape of the socket 34 of the second seed support 42 aligns with the orientation of the previously misaligned seed 82. Subsequently the seed 82 is held in its correctly orientated and upside-down position by suction continuously applied to the negative pressure connection 83 of the second seed support.

Figure 9A:
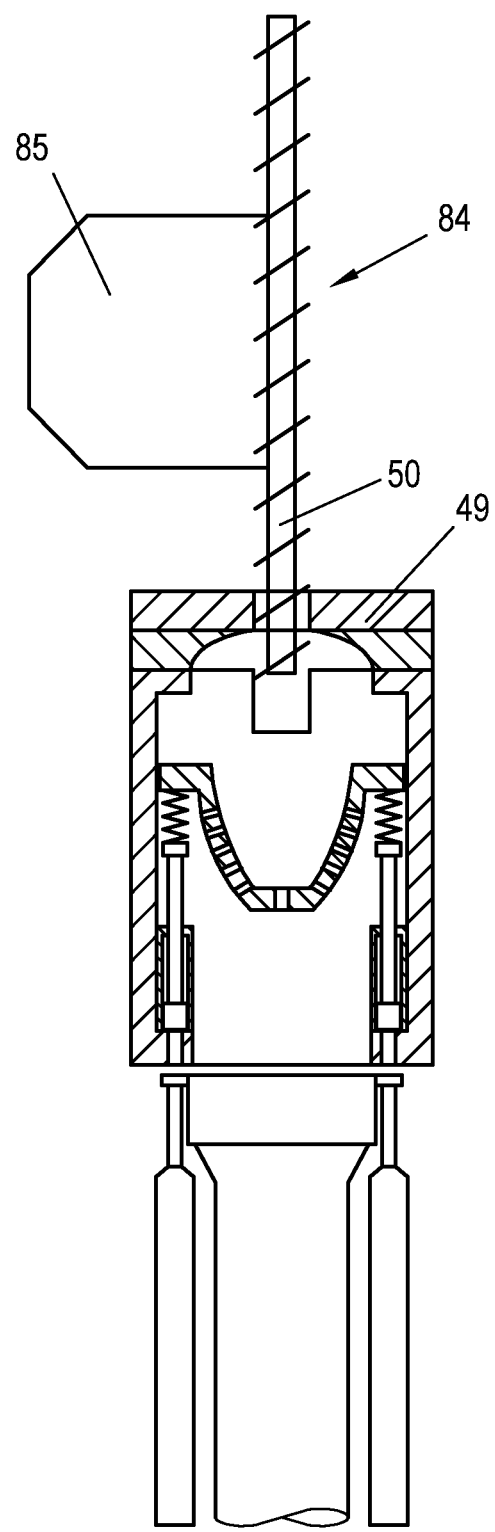
FIG. 9a shows a seed support according to FIG. 7b together with opening means comprising a saw blade.
Figure 9B:
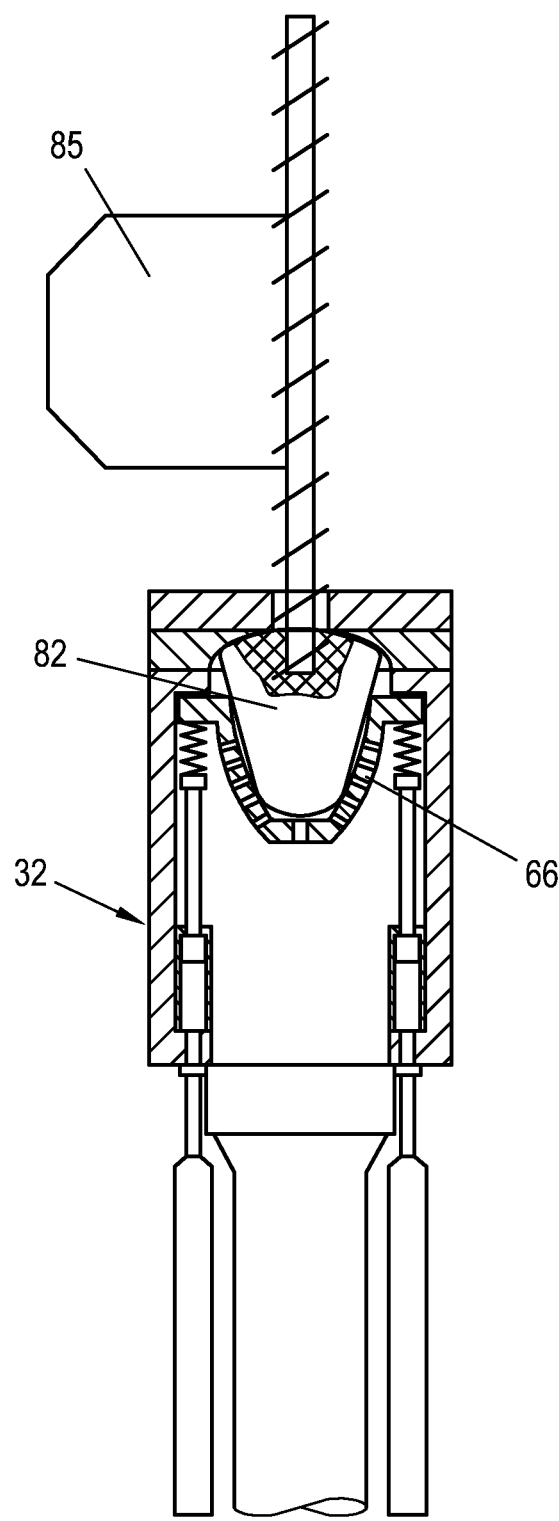
FIG. 9b shows the arrangement of FIG. 9a with a seed received in the seed support and opened by cutting.

FIGS. 9a and 9b show the opening means 84 comprising a saw blade 50 in more detail. The saw blade 50 traverses a slit in the base plate 49 of the opening means 84 and is arranged at a fixed vertical distance from said base plate 49. The saw blade 50 is coupled to a motor 85 for rotating the saw blade 50. In operation (see FIG. 9b), a seed 82 received in a seed support 32 arranged in an opening position 48 underneath the base plate 49 is opened by pushing the seed 82 towards the saw blade 50. In the shown example having a movable basket 66 forming the socket 34 of the seed support 32 (cf. FIG. 7b), the basket 66 holding the seed 82 is pushed against the base plate 49 by means of a pneumatic mechanism as described above for ejecting seeds. To stabilize the seed 82 with respect to the saw, the base plate 49 has a longitudinal recess corresponding to the profile of the upper side of the seed 82. While opening the seed 82, the seed 82 is secured inside the basket 66 by negative pressure applied to the space 75 below the sieve-like basket 66 and by being mechanically pressed against the base plate 49 via the pistons 70 and springs 68. In addition, the resilient inner surface of the basket 66 ensures a large contact surface and increased friction between the seed 82 and the basket 66.

Figure 10:
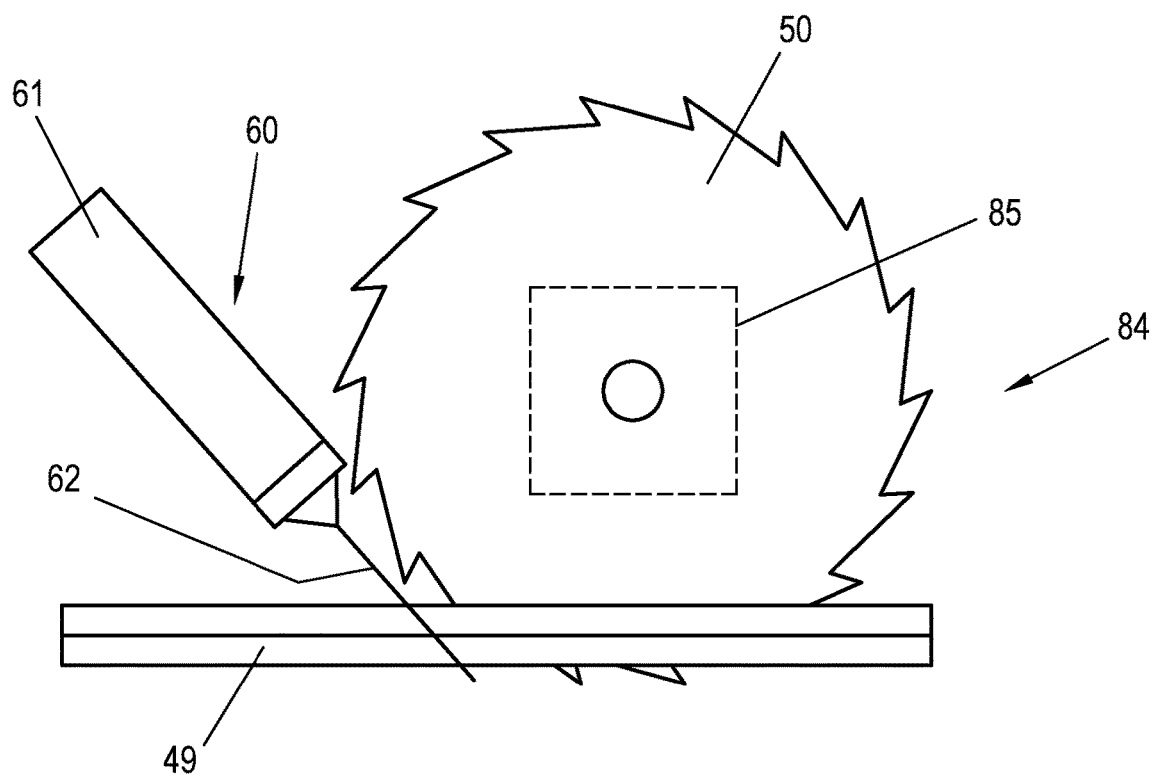
FIG. 10 shows a detailed view of the opening and injecting means according to FIG. 6.

FIG. 10 shows the opening means 84 together with the introducing means 60 of FIG. 6 in more detail. The needle 62 connected to the nozzle 61 for introducing the additive penetrates the base plate 49 to a similar extent as the saw blade 50.

Figure 11:
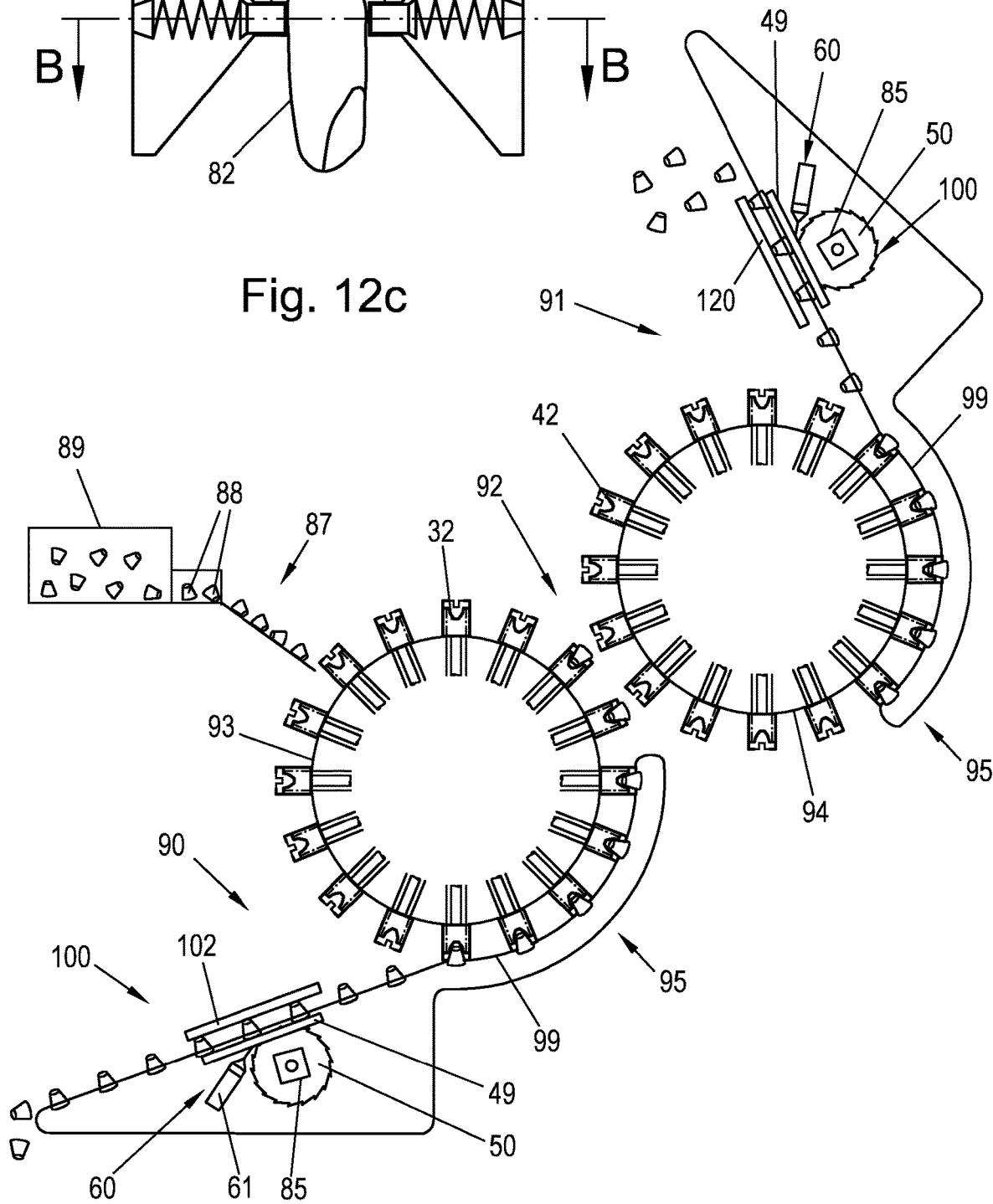
FIG. 11 shows a schematic overview of an alternative apparatus for preparing seeds wherein two different types of seed support are applied.

Another embodiment of an apparatus 86 according to the invention is shown in FIG. 11. The apparatus 86 comprises feeding means 87 removing unprepared seeds 88 from a seed storage 89 and transporting the singularized seeds 88 to a first processing line 90 of the apparatus 86. The apparatus 86 further comprises a second processing line 91, essentially mirroring the first processing line 90, although without dedicated feeding means. Instead, and as in the previous example (FIG. 6) there is a handover track 92 for handing over misaligned seeds from a first seed support 32 of the first processing line 90 to an opposite and synchronized second seed support 42 of the second processing line 91 when the seed supports 32, 42 are in a handover position 45 (not shown). The first and second seed supports 32, 42 are mounted on synchronized rollers 93, 94, which in operation are rotating in opposite directions in order to achieve a parallel movement of seed supports 32, 42 along the handover track 92.

The further processing of the first and second processing lines 90, 91 after a seed has been received in one of the respective seed supports 32, 42 is basically mirrored and thus functionally identical. Therefore, it will be described only once for both processing lines 90, 91 without using separate references to the drawings.

Figure 12C:
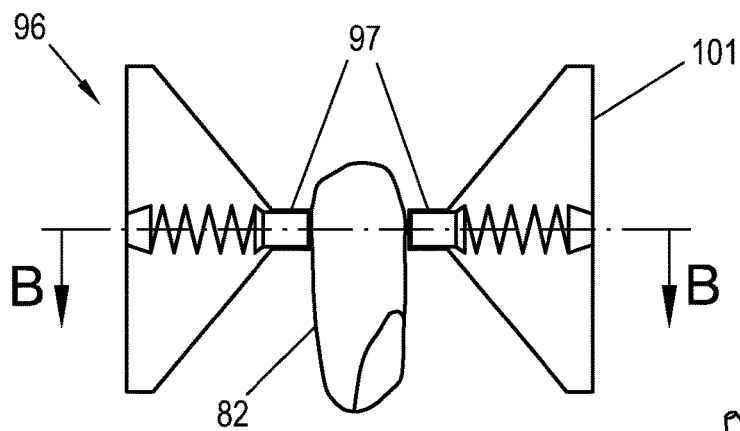
Figure 12A:
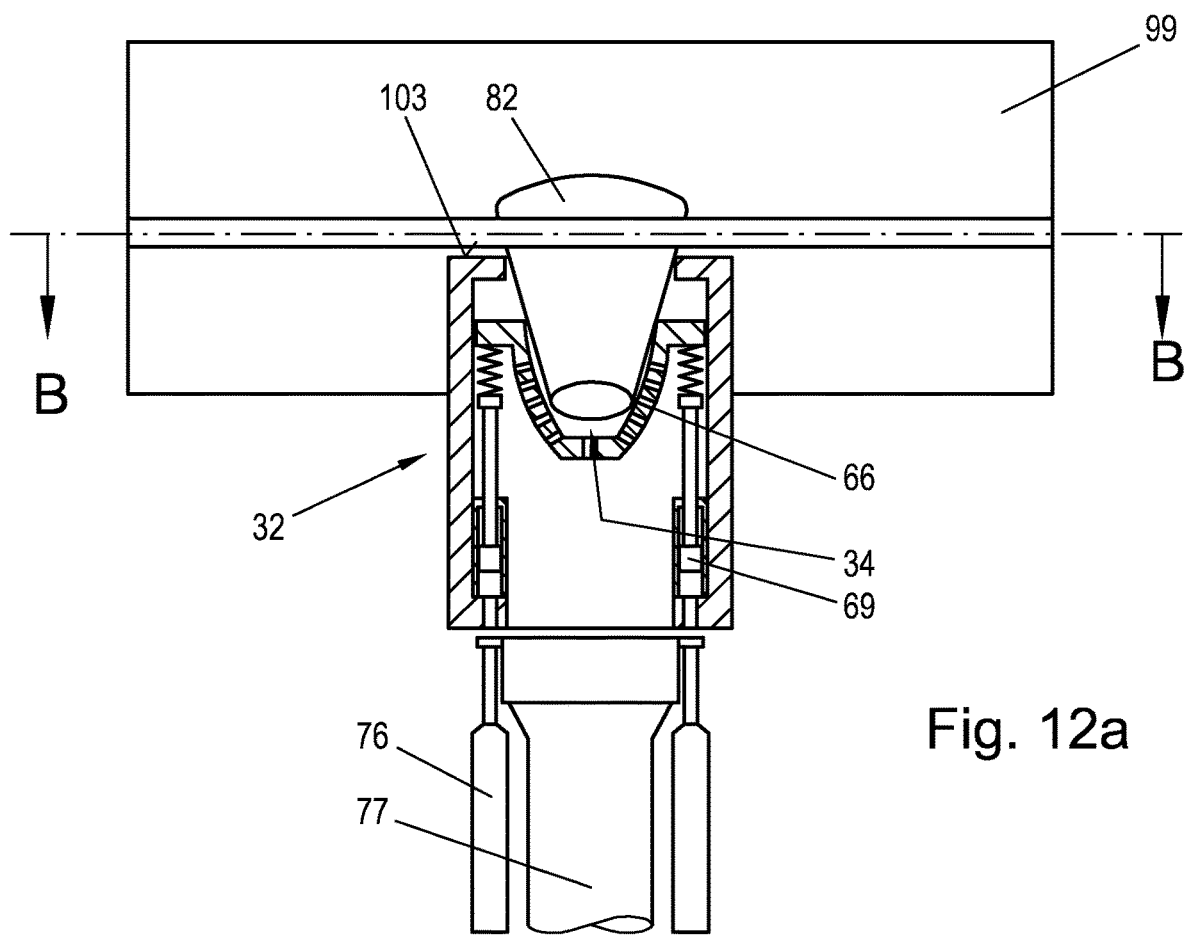
Figure 12B:
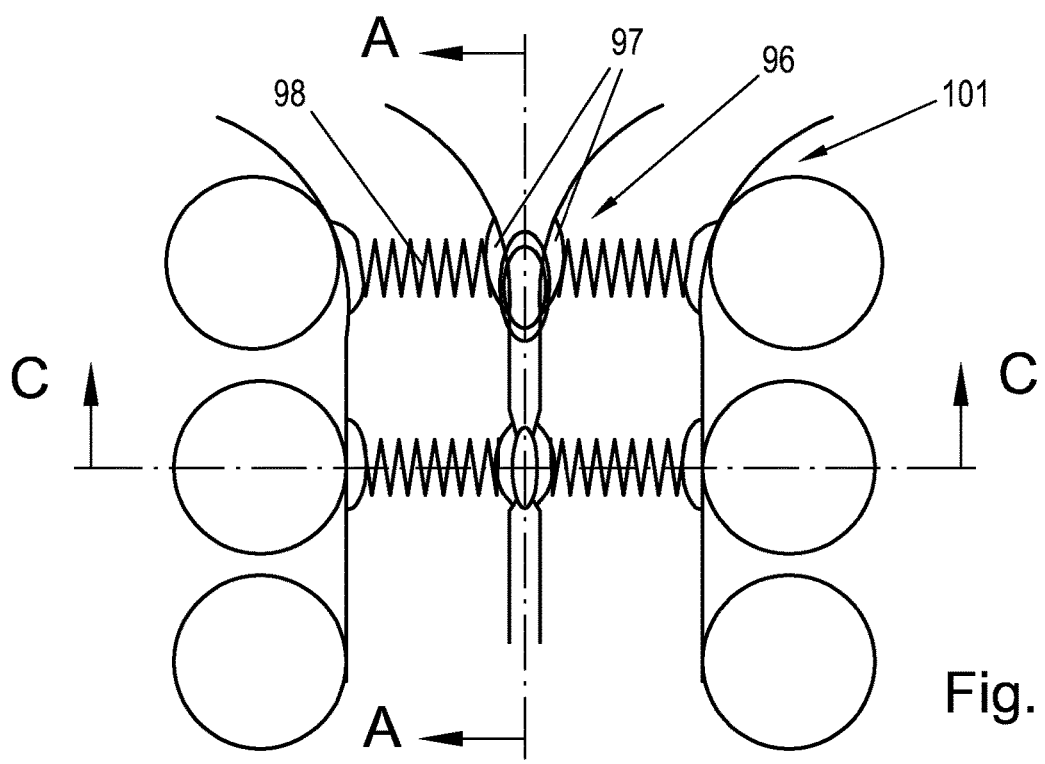

Subsequent to the handover track 92 between the two processing lines 90, 91, and the handover position 45, the seed support 32 is moved to a clamping track 95 for inserting a seed 82 into a third seed support 96 (see FIGS. 12b and 12c). The third seed support 96 is basically a spring-loaded clamping device. It comprises two contacting elements 97 for holding the seed 82 between them. The contacting elements 97 are arranged opposite one another and are each suspended on a spring 98, wherein the springs 98 are arranged along a common axis perpendicular to the direction of transport of the seed 82 (which is tangential to the roller 93). Each contacting element 97 forms a recess to partially receive the seed 82, wherein the shape of the recess is adapted to the shape of the processed seeds. For enclosing and holding the seed 82, the springs 98 are compressed by bringing the opposite conveyors 101 closer together.

At least one third seed support 96 is arranged on a separate conveying means 99 for moving the third seed support 96 from the clamping track 95 to the opening means 100. The conveying means 99 comprises two conveyors 101, each supporting one contacting element 97 of each third seed support 96. In the third seed support 96, the seed 82 is clamped between the contacting elements 97 (see FIG. 12c) and the contacting elements 97 are pressed against the seed 82 by the compressed springs 98, i.e., the seed 82 is held in an equilibrium between the two opposite springs 98. A movement of the seed transverse to the contacting elements 97 is limited due to friction between the contacting elements 97 and the seed 92. In addition, the contacting elements 97 may by coated with a non-slip material, e.g., rubber, plastics or roughening coatings such as with abrasive materials, and may have a concave shape or depression in order to achieve form-fit between the contacting elements 97 and the seed 82 and thus facilitate the hold on the seed. To further support the seed 82 against transverse movement, especially under the influence of the opening means 100, e.g., the pressure applied by the base plate 49 and the saw blade 50 (see FIG. 10 and the corresponding description) of the opening means 100, the opening means 100 comprises a conically shaped support slide 102, which guides and supports the seed 82 when it is being opened. The seed 82 is therefore dragged along the support slide 102 when the base plate 49 moves to adjust to the length of the seed 82 and achieve a uniform opening depth with the saw blade 50 supported in a fixed arrangement with the base plate 49. Different seed sizes are compensated by the support slide 102, which presses the seeds against the base plate 49 and the saw blade 50. After the opening means 100, the introducing means 60 are arranged as described earlier to introduce the additive into the newly created opening in the seed 82. The readily prepared seed 82 is then dropped from the third seed support 96 and the conveying means 99 into a collecting appliance (not shown).

FIG. 12a shows in more detail the arrangement between the first seed support 32 and the third seed support (only schematically indicated), in particular, their vertical arrangement. Specifically, the first seed support 32 holding the seed 82 in its socket 34 by means of suction, as described in connection with FIG. 7b, is aligned with the conveying means 99 of the third seed support such that the upper side 103 of the first seed support is arranged just below the contacting elements 97. Similar to the movement described in connection with FIG. 9b, the basket 66 of the first seed support 32 is moved toward the upper side 103 such that the seed 82 is sticking out of the first seed support 32. The part of the seed 82 outside the socket 34, i.e., above the upper side 103 of the first seed support 32, is then clamped between the contacting elements 97 as described above. Once the seed 82 is held by the third seed support, the hold of the first seed support 32 is released by removing the negative pressure from the socket 34. Moreover, the basket 66 can be lowered at this point by removing the positive pressure from the positive pressure connections 76 and thus allowing a recession of the piston rods 69 in order to facilitate the withdrawal from the first seed support 32 at the end of the clamping track 95.

Figure 13:
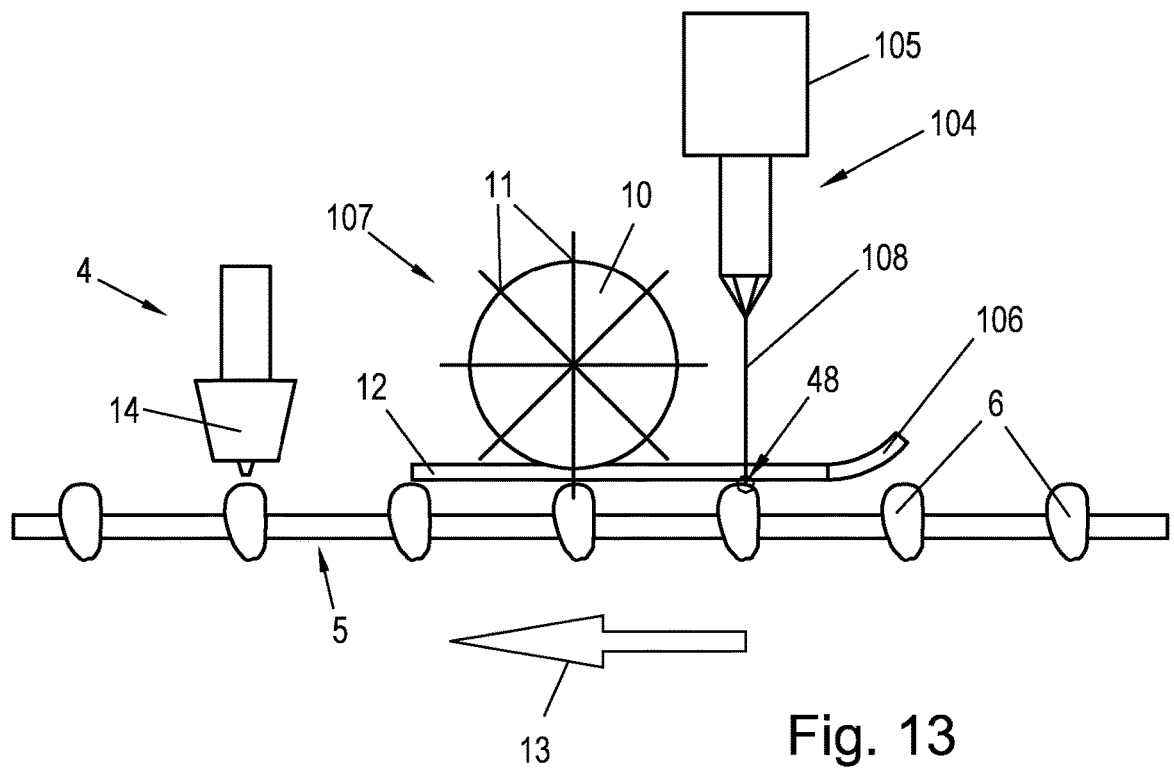
FIG. 13 shows a schematic view of a simplified apparatus for preparing seeds, wherein an opening means is based on a vertical cutting laser.

In FIG. 13 an alternative opening means 104 is shown, which comprises a laser device 105, in particular, a laser cutting device or a laser grooving device. Similar to the opening means 2 in FIG. 1, the seed 6 is moved by the conveying means 5 along the underside of a base plate 106. In this embodiment, a common base plate 106 is used for the opening means 104 and the introducing means 107. The laser device 105 used to open the seed 6 is suspended independently from the base plate 106 because a fixed distance between the seed 6 and the laser grooving device 105 is not essential. The base plate 106 has an opening (not shown) for the laser beam 108 emitted by the laser device 105. The laser beam 108 can be used to cut or groove the upper side of the seed 6 in an opening position 48 below the base plate 106. The injecting means 107 and the subsequent closing means 4 works similar to the injecting means 3 and closing means 4 described in connection with FIG. 1. In the present embodiment (FIG. 13), the laser beam 108 generated by the laser device 105 is essentially transverse to the conveying direction 13 of the conveying means 5.

Figure 14:
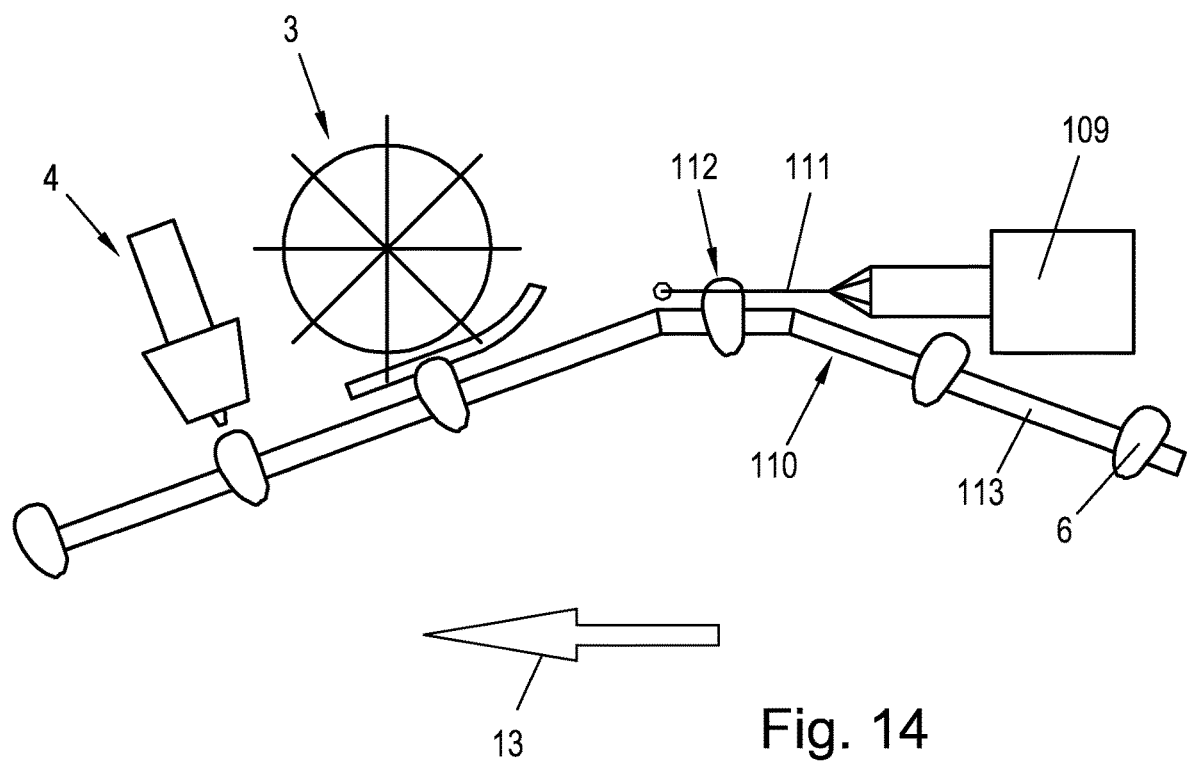
FIG. 14 shows a schematic view of a simplified apparatus for preparing seeds, wherein an opening means is based on a horizontal cutting laser.

In a further embodiment according to FIG. 14, the laser device 109 is arranged relative to the conveying means 110 such that the laser beam 111 generated by the laser device 109 is essentially parallel to the conveying direction 13 of the conveying means 110 at the opening position 112. In order to approach the seed 6 to the laser beam 111, the conveying means 110 comprises a buckled conveyor belt 113 which has an apex at the opening position 112. The opening depth produced in the seed 6 by the laser beam 112 is therefore controlled by the course of the conveying means 110, specifically the distance between the conveyor belt 113 and the laser beam 111. Subsequent to the opening position 112, the opened seed 6 is moved on to introducing means 3 and closing means 4 similar to those described in connection with FIG. 1.

Figure 15:
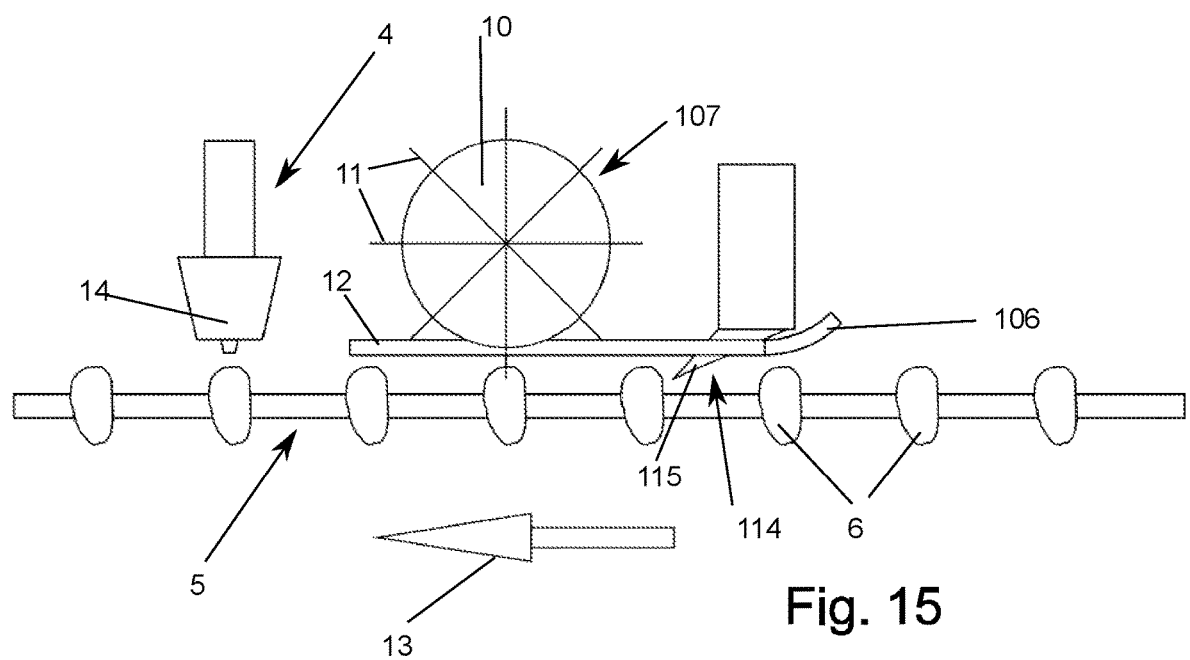
FIG. 15 shows a schematic view of a simplified apparatus for preparing seeds, wherein an opening means includes a fixed blade.
Figure 16:
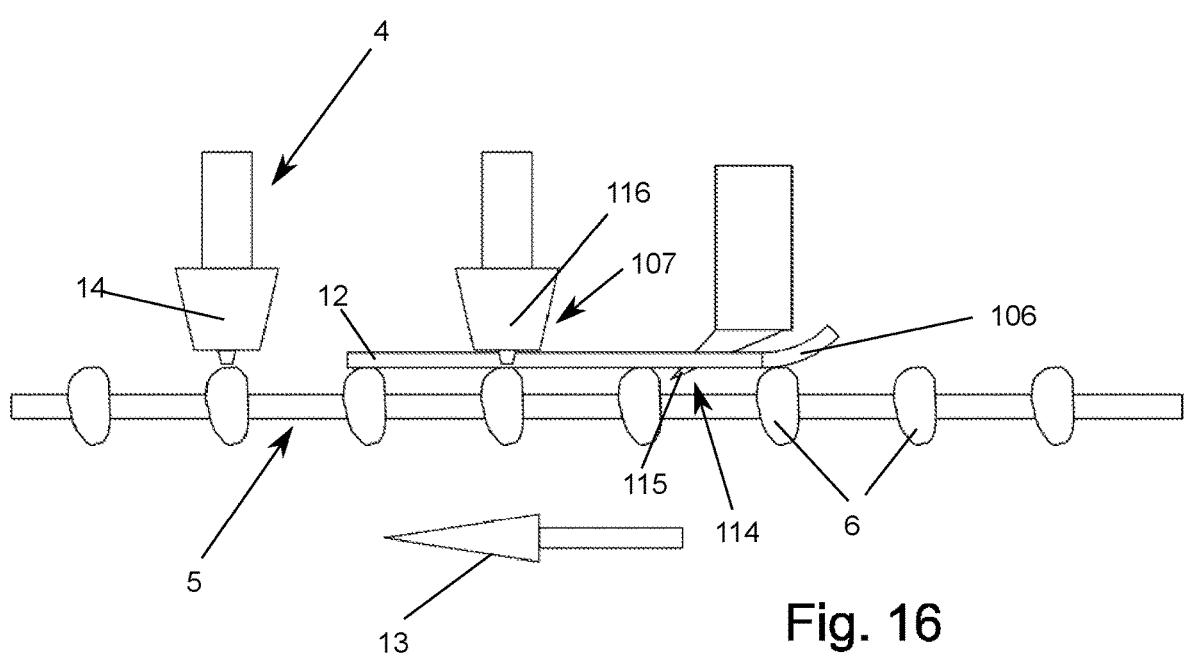
FIG. 16 shows a schematic view of a simplified apparatus for preparing seeds, wherein the injection means includes an injection nozzle.

Referring to FIG. 15, in another embodiment, the opening means 114 comprises a fixed blade 115. The seeds 6 are continuously moved or transported under the fixed blade 115 by the conveying means 5 in the conveying direction 13 as described in detail in connection with the previous embodiments. In this embodiment, the fixed blade 115 is a blade that is stationary. The fixed blade 115 may be positioned at different angles relative to the conveying means 5 to ensure that the seeds 6 sufficiently engage the fixed blade 115 to open each of the seeds. Furthermore, different blades of different types, such as knifes or blades that are serrated, hollow, flat, Scandi or single-sided, may be used as the fixed blade 115. Cutting with a knife or blade may be a solution for different types of grains or seeds. For example, soft seeds, such as soy, oil pumpkin or cucumber seeds, may be cut with a knife or blade and then injected with an additive as described above. In the illustrated embodiment, the fixed blade 115 extends at least partially under base plate 106 to open each of the seeds 6. It should be appreciated that the fixed blade may be at any suitable position relative to the base plate 106. In the illustrated embodiment, the injecting means 107 comprises a pivotable disk 10 or injection wheel that injects a defined amount of additive or other substance, into each of the opened seeds 6. In a further embodiment shown in FIG. 16, the injecting means 107 is an injection nozzle 116, which sprays the inoculum with the additive into the opening formed in each of the seeds 6 by the fixed blade 115 as described above.

What is claimed is:

1. A method for automatically preparing seeds with an additive to be deployed together with the seeds, the method comprising:
    conveying a plurality of seeds into an opening position;
    creating an opening in each of the seeds by cutting each seed with a fixed blade or a laser device when each seed is in the opening position;
    introducing an amount of additive into the seed through the opening; and
    continuously conveying the plurality of seeds while creating the opening and introducing the amount of additive into the seeds.

2. The method according to claim 1, wherein prior to conveying the seed into the opening position, the method further comprises:
    receiving the seed on a seed retainer;
    verifying an orientation of the seed on the seed retainer; and
    if an orientation of the seed differs from a predetermined orientation removing the seed from the seed retainer.

3. The method according to claim 2, wherein the seed retainer is formed by a seed support, to which the seed is fastened before verifying the orientation.

4. The method according to claim 3, wherein the seed is fastened to the seed support by adherence.

5. The method according to claim 1, wherein the created opening penetrates the seed coat and the additive injected into the endosperm or between the endosperm and the embryo of the seed.

6. The method according to claim 1, further comprising orientating the seed to a predetermined orientation prior to conveying the seed into the opening position.

7. The method according to claim 6, wherein the orientation of the seeds is achieved by: applying a vibrating motion or a pneumatic pressure, performing mechanical sieving through different pore sizes, or mechanical sorting, before verifying the orientation of the seed.

8. An apparatus for automatically preparing seeds with an additive to be deployed together with the seeds, the apparatus comprising:
    a fixed blade configured for creating an opening in each of the seeds;
    introducing means for introducing an amount of additive into each of the seeds through the opening created in each seed; and
    conveying means for continuously transporting the seeds to the fixed blade while the fixed blade creates the opening in each seed.

9. The apparatus according to claim 8, wherein the conveying means comprises a seed retainer for receiving the seed, wherein the apparatus further comprises verification means for verifying the orientation of the seed on the seed retainer before transporting the seed to the fixed blade.

10. The apparatus according to claim 9, wherein the conveying means comprises an ejecting means connected with the verification means and configured to remove the seed from the seed retainer if an orientation of the seed differs from a predetermined orientation.

11. The apparatus according to claim 8, further comprising orientating means for orientating the seed before it is opened by the fixed blade.

12. An apparatus for automatically preparing seeds with an additive to be deployed together with the seeds, the apparatus comprising:

a laser device configured for creating an opening in each of the seeds;

introducing means for introducing an amount of additive into each of the seeds through the opening created in each seed; and conveying means for continuously transporting the seeds to the laser device while the laser device creates the opening in each seed.

13. The apparatus according to claim 12, wherein the conveying means comprises a seed retainer for receiving the seed, wherein the apparatus further comprises verification means for verifying the orientation of the seed on the seed retainer before transporting the seed to the laser device.

14. The apparatus according to claim 13, wherein the conveying means comprises an ejecting means connected with the verification means and configured to remove the seed from the seed retainer if an orientation of the seed differs from a predetermined orientation.

15. The apparatus according to claim 12, further comprising orientating means for orientating the seed before it is opened by the laser device.

* * * * *